US012784721B1

(12) United States Patent
Grossman et al.

(10) Patent No.: US 12,784,721 B1
(45) Date of Patent: Nov. 3, 2026

(54) METHODS AND COMPUTER PROGRAM PRODUCTS FOR PRODUCING AN OPTIMIZED PROMPT FOR USE BY AN AUTOMATIC CONTENT GENERATOR

(71) Applicant: Playworks Partners LLC, Huntington, NY (US)

(72) Inventors: Steve Grossman, Huntington, NY (US); Rich Rosado, Huntington, NY (US)

( * ) Notice: Subject to any disclaimer, the term of this patent is extended or adjusted under 35 U.S.C. 154(b) by 0 days.

(21) Appl. No.: 19/446,572

(22) Filed: Jan. 12, 2026

(51) Int. Cl.
*G10H 1/00* (2006.01)
*A63F 13/533* (2014.01)
*G06F 40/40* (2020.01)

(52) U.S. Cl.
CPC ........... *G10H 1/0025* (2013.01); *G06F 40/40* (2020.01); *A63F 13/533* (2014.09); *G10H 2210/026* (2013.01); *G10H 2210/111* (2013.01); *G10H 2220/116* (2013.01)

(58) Field of Classification Search
CPC ........... G10H 1/0025; G10H 2210/026; G10H 2210/111; G10H 2220/116; G06F 40/40; A63F 13/533; G06N 3/0475
See application file for complete search history.

(56) References Cited

U.S. PATENT DOCUMENTS 7,301,093 B2 11/2007 Sater et al.
7,790,974 B2 9/2010 Sherwani et al.
8,710,343 B2 4/2014 Kellett et al.
9,672,800 B2 6/2017 Gozzi
10,007,893 B2 6/2018 Emmerson
10,068,556 B2 9/2018 Gouyon et al.
10,467,998 B2 11/2019 Silverstein
10,891,928 B2 1/2021 Luan et al.
11,024,276 B1 6/2021 Dabby
11,049,481 B1 6/2021 Li et al.
11,200,881 B2 12/2021 Witherspoon et al.
11,264,002 B2 3/2022 Ackerman et al.
(Continued)

FOREIGN PATENT DOCUMENTS

CN 104391980 A 3/2015
CN 105070283 A 11/2015
(Continued)

*Primary Examiner* — Jeffrey Donels
(74) *Attorney, Agent, or Firm* — Anglehart et al.

(57) ABSTRACT

An improved method of generating a text-based prompt by providing an additional filtering step for reducing the occurrence of conflicting concepts and language thereby increasing both the coherence of the prompt and the quality of the generated content. This filtering prevents conflicting parameters or language by prioritizing one of the conflicting elements, thereby resolving the conflict and preventing it from being perpetuated. This filtering step ensures that the prompt generated is coherent, does not violate the priority rules and does not perpetuate or induce mistakes down the line. Also described is a computer program product for performing the method and for providing a user interface for accessing and using the method. The program is also improved to be used in combination with and/or integrated in another application to enhance user experience and provide additional functions. Gamification features are also proposed to improve the user experience and retain or increase usership.

20 Claims, 18 Drawing Sheets

(56) References Cited

U.S. PATENT DOCUMENTS

| | | | | |
|---|---|---|---|---|
| 11,587,541 | B2 | 2/2023 | Wu et al. | |
| 11,699,420 | B2 | 7/2023 | Godunov | |
| 11,705,096 | B2 | 7/2023 | Huang et al. | |
| 11,741,922 | B2 | 8/2023 | Rein et al. | |
| 12,423,388 | B2 * | 9/2025 | Horton | G06F 16/632 |
| 2018/0322854 | A1 | 11/2018 | Ackerman et al. | |
| 2018/0374461 | A1 | 12/2018 | Serletic et al. | |
| 2019/0066643 | A1 | 2/2019 | Packouz et al. | |
| 2020/0090632 | A1 | 3/2020 | Rein et al. | |
| 2020/0142926 | A1 | 5/2020 | Bencar et al. | |
| 2021/0158789 | A1 * | 5/2021 | Wu | G06N 3/045 |
| 2021/0335334 | A1 | 10/2021 | Ackerman et al. | |
| 2022/0223125 | A1 | 7/2022 | Zhou et al. | |
| 2022/0406280 | A1 | 12/2022 | Kishi | |
| 2023/0298547 | A1 | 9/2023 | Kishi | |
| 2023/0326436 | A1 | 10/2023 | Colombo | |
| 2026/0030325 | A1 * | 1/2026 | Horton | G06F 21/106 |

FOREIGN PATENT DOCUMENTS

| | | | | |
|---|---|---|---|---|
| CN | 106898340 | A | 6/2017 | |
| CN | 107799119 | A | 3/2018 | |
| CN | 108269560 | A | 7/2018 | |
| CN | 108346418 | A | 7/2018 | |
| CN | 109599079 | A | 4/2019 | |
| CN | 111161695 | A | 5/2020 | |
| CN | 111554267 | A | 8/2020 | |
| CN | 111862911 | A | 10/2020 | |
| CN | 113095046 | A | 7/2021 | |
| CN | 113793578 | A | 12/2021 | |
| CN | 113838443 | A | 12/2021 | |
| CN | 114023286 | A | 2/2022 | |
| CN | 114550690 | A | 5/2022 | |
| CN | 116524882 | A | 8/2023 | |
| EP | 4020458 | A1 | 6/2022 | |
| GB | 2615222 | A | 8/2023 | |
| KR | 102560394 | B1 | 7/2023 | |
| WO | 2022/133479 | A1 | 6/2022 | |
| WO | WO-2025221244 | A1 * | 10/2025 | G10H 1/38 |
| WO | WO-2025245618 | A1 * | 12/2025 | G10H 1/36 |

* cited by examiner

Lyrics parameters options
(Own Lyrics 78)

Lyrics parameters options
(Manual session 77)

Voice selection
(12)

Voice recorder
(80)

Voice recorder parameters

Reward system (20)

Reward system
(Acquired rewards)

Reward system
(Achievement's progress and rewards)

METHODS AND COMPUTER PROGRAM PRODUCTS FOR PRODUCING AN OPTIMIZED PROMPT FOR USE BY AN AUTOMATIC CONTENT GENERATOR

TECHNICAL FIELD

This document relates to generation of prompt input for artificial intelligence generators; namely to the optimization of the automatic generation of prompt inputs for the automatic content generator based on user selection and/or inputs.

BACKGROUND

Methods of producing music using computer tools and programs have been improving. While some of the state-of-the-art tools are highly specialized and may require significant musical skills and software proficiency, some of the tools are specifically tailored to entry level (hobbyist) music producers.

With the advent of artificial intelligence (AI), various AI song generating services have been made available. These AI song generators now allow anyone to produce/generate song segments (e.g., a few seconds, samples, 1 to N verse(s), entire song) and/or components (background music, back vocals, lyrics, voices, etc.) thereof without necessarily requiring any musical skills. Most of the AI song generators are configured to receive prompts (text-based inputs) making it convenient and easy for anyone to use.

In that context some song generating tools, programs and user interfaces providing an AI song generator or using 3$^{rd}$ party AI song generators are now available to make the song generation even more convenient and intuitive for the users. Some of these tools provide prompt generators including functions for helping the user select song characteristics and for using the selected characteristics to automatically generate a single the prompt for use by the AI song generator. These prompt generator functions are useful to automatically generating the prompt, thereby simplifying even further the song producing process, and are used to remove from the prompt profanity and offensive language that may be selected by the user. However, the state-of-the-art prompt generators are quite limited and, other than basic profane/offensive language removing functions, lack any significant or sophisticated verification or filtering capacities.

The prompts generated by the state-of-the-art prompt generator are usually simple collection of parameters including all the song characteristics selected or manually added by a user, which can lead to duplicate and conflicting language in the resulting prompt. AI song generators that receive and process a prompt with duplicate and conflicting language has a high likelihood of getting "confused" thereby, resulting in incoherent lyrics, low-quality music and even "AI slop" output. Therefore, there is a need to reduce the frequency of duplicates and conflicting language comprised in the AI prompt. At least for these reasons, there is a need to develop a method for filtering duplicate or conflicting languages out of the generated prompt. Additionally, there is a need to improve the song's characteristic selection process to speed it up and to streamline the song production process, while promoting user's creativity and improve the overall user experience.

SUMMARY

The present document presents an improved method of generating a text-based prompt by providing an additional filtering step for reducing the occurrence of conflicting concepts and language thereby increasing both the coherence of the prompt and the quality of the generated content. This filtering prevents conflicting parameters or language by prioritizing one of the conflicting elements, thereby resolving the conflict and preventing it from being perpetuated. This filtering step ensures that the prompt generated is coherent, does not violate the priority filtering rules and does not perpetuate or induce mistakes down the line. Also described is a computer program product for performing the method and for providing a user interface for accessing and using the method. The program is also improved to be used in combination with and/or integrated in another application to enhance user experience and provide additional functions. Gamification features are also proposed to retain or increase usership.

It will be appreciated that the filtering method described in the present document significantly improves the computing device, the technology or the technical field is used with or it pertains to. In fact, the conflict filtering step may be completed to generate the prompt for use by the automatic content generator improves the functioning of the basic prompt normally produced in the state of the art because it improves the quality of the generated content. The filtering method solves drawbacks/problems that only arise specifically when the task of producing a prompt is completed by a computer program.

The present document describes various embodiments of integrated computer programs for producing content, such as a song segment and/or song components, based on user inputs, where a text-based prompt generated process includes a conflict filtering step to avoid or at least reduce the frequency of duplicates and conflicting language comprised in the AI prompt.

One broad aspect of the disclosure is a first computing program product for generating a text-based prompt based on song parameters determined by a user, the text-based prompt being usable as an input of an automatic content generator for generating at least one automatically generated song components based on the input, the computing program product comprising non-transitory memory storing executable program code that, when executed by a processor, causes the processor to: (a) provide a user with song parameters options comprising at least one of the groups consisting of: (a.1) a list of predefined song parameters options, and (a.2) randomized keywords each indicative of at least one of the song parameter options; (b) receive at least one of the group consisting of: (b.1) one or more user input indicative of a selected one of the provided song parameters options, and (b.2) one or more user-provided song parameter; (c) determine the song parameters based on the at least one received user input and user-provided song parameter; (d) identify a priority song parameter among the song parameters; (e) access filtering rules specific to said priority song parameter, said filtering rules reducing a chance of conflict between said priority song parameter and a remainder of the song parameters; (f) filter the song parameters using said filtering rules; (g) determine a text-based prompt for use by the automatic content generator based on the filtered song parameters, wherein said prompt has a reduced chance to generate a song inconsistent with said priority song parameter.

In some embodiments of the computing program product, the step of determining the song parameters or the step of determining the text-based prompt is further based on contextual information originating from a complementary application program, wherein the contextual information comprises at least one of: personal information of the user; external content information; and contextual information.

In some embodiments of the computing program product, the priority song parameter is a predetermined specific music genre, and wherein the filtering rules comprise one or more rules that ensure that the music genre of the at least one automatically generated song component corresponds to the specific music genre.

In some embodiments of the computing program product, the specific music genre, and wherein the filtering rules comprise one or more rules that ensure that the music genre of the at least one automatically generated song component is rap if the determined song parameters include at least one music genre other than Rap or does not include any music genre.

In some embodiments of the computing program product, the step of determining the song parameters or the step of determining the text-based prompt is further based on sponsored advertisement information.

In some embodiments of the computing program product, the sponsored advertisement information includes audience targeting data.

In some embodiments of the computing program product, the program code, when executed by the processor, further causes the processor to provide additional randomized keywords when requested by the user.

In some embodiments of the computing program product, the song parameters comprise background lyrics parameters, wherein the text-based prompt comprises instructions defining desired song lyrics, and wherein the at least one automatically generated song components include an automatically generated song lyrics.

In some embodiments of the computing program product, the at least one automatically generated song component is at least one of the groups consisting of: (i) background music; (ii) a singer voice; (iii) song lyrics; (iv) album or song cover art; and (v) at least part of a music video.

In some embodiments of the computing program product, the filtering rules used in the step of filtering the song parameters comprises removing the remainder of the conflicted song parameters.

In some embodiments of the computing program product, the song parameters comprise background music parameters, wherein the text-based prompt comprises instructions defining a desired background music, and wherein the at least one automatically generated song components include an automatically generated background music.

In some embodiments of the computing program product, the song parameters comprise voice parameters and lyrics parameters, wherein the text-based prompt comprises instructions defining a desired song vocals in a desired singing voice, and wherein the at least one automatically generated song components include an automatically generated song vocals.

In some embodiments of the computing program product, the provided song parameter options comprise at least one of the group consisting of: (i) background music parameter options; voice parameter options; (ii) lyrics parameter options; and (iii) video parameter options.

In some embodiments of the computing program product, the background music parameter options include background music provided by the user's device or an automatically generated background music generated by the automatic generator.

In some embodiments of the computing program product, the one or more user-provided song parameter is received comprises lyrics provided by the user; and wherein the step of determining the song parameters is based at least on the lyrics provided by the user.

In some embodiments of the computing program product, one of the automatically generated song components is an artificial intelligence (AI) generated song component, and wherein the content generator is an AI generator for generating at least one of the AI generated song components.

In some embodiments of the computing program product, the provided song parameter options comprise the lyrics parameter options, said lyrics parameter options comprise AI-generated keywords provided by a natural language model (NLM) in response to the user-provided keyword.

In some embodiments of the computing program product, the NLM is one of: (i) the AI lyrics generator; (ii) a thematic lyric generation model; (iii) a contextual lyric synthesis model; and (iv) a large language model trained on lyric corpora.

In some embodiments of the computing program product, the program code, when executed by the processor, further causes the processor to: use a microphone of a user's computing device to record a voice recording; alter or modulate the recorded voice recording to change how a voice of the voice recording sounds to a listener when playback through a speaker.

In some embodiments of the computing program product, the program code, when executed by the processor, further causes the processor to use a speaker of the user's computing device to play background music or a metronome sound during a recording of the voice recording.

In some embodiments of the computing program product, the program code, when executed by the processor, further causes the processor to provide a dedicated randomizer interface comprising a gamified interactive user interface.

In some embodiments of the computing program product, the gamified interactive user interface provides at least one of: a slot machine interactive user interface; a rap battle interactive user interface; a bowling alley interactive user interface; a word shaker interactive user interface; and a balloon or bubbles popper interactive user interface.

Another broad aspect of the disclosure a second computing program product for generating a text-based prompt based on song parameters determined by a user, the text-based prompt being usable as an input of an automatic content generator for generating at least one automatically generated song components based on the input, the computing program product comprising non-transitory memory storing executable program code that, when executed by a processor, causes the processor to: (a) provide a user with song parameters options comprising at least one of the groups consisting of: a list of predefined song parameters options, and randomized keywords each indicative of at least one of the song parameter options; (b) receive at least one of the group consisting of: one or more user input indicative of a selected one of the provided song parameters options, and one or more user-provided song parameter; (c) determine the song parameters based on the at least one received user input and user-provided song parameter; (d) determine a text-based prompt for use by the automatic content generator based on the determined song parameters and on external information originating from a complementary application program, wherein the external information comprises at least one of: personal information of the user; external content information; and contextual information.

In some embodiments of the second computing program product, the external information further comprises sponsored advertisement information.

In some embodiments of the second computing program product, the sponsored advertisement information includes audience targeting data.

Yet another broad aspect of the disclosure is a third computing program product for generating a text-based prompt based on song parameters determined by a user, the text-based prompt being usable as an input of an automatic content generator for generating at least one automatically generated song components based on the input, the computing program product comprising non-transitory memory storing executable program code that, when executed by a processor, causes the processor to: (a) provide a user with song parameters options comprising at least one of the groups consisting of: a list of predefined song parameters options, and randomized keywords each indicative of at least one of the song parameter options, wherein the randomized keywords are provided via a gamified interactive user interface; (b) receive at least one of the group consisting of: one or more user input indicative of a selected one of the provided song parameters options, and one or more user-provided song parameter; (c) determine the song parameters based on the at least one received user input and user-provided song parameter; (d) determine a text-based prompt for use by the automatic content generator based on the filtered song parameters.

In one embodiment of the third computing program product, the gamified interactive user interface provides at least one of: (i) a slot machine interactive user interface; (ii) a rap battle interactive user interface; (iii) a bowling alley interactive user interface; (iv) a word shaker interactive user interface; and (v) a balloon or bubbles popper interactive user interface.

BRIEF DESCRIPTION OF THE DRAWINGS

The invention will be better understood by way of the following detailed description of embodiments of the invention with reference to the appended drawings, in which.

DETAILED DESCRIPTION

Figure 1:
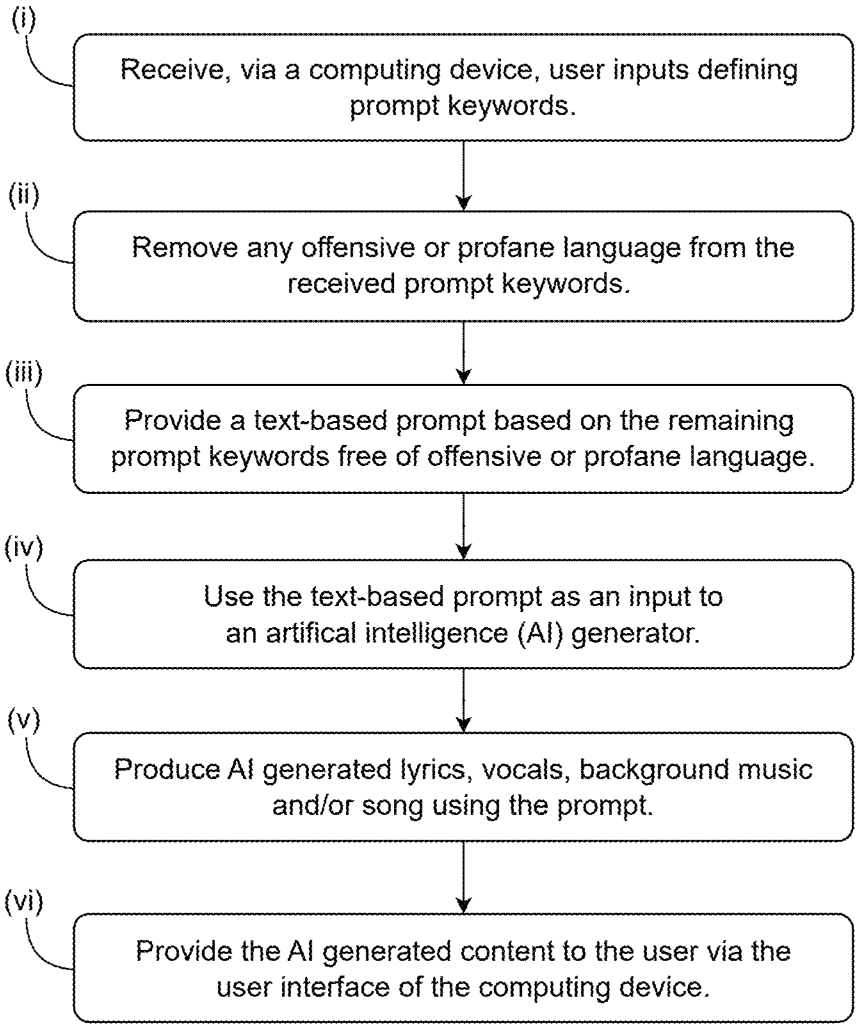
Figure 1 (Prior art)
FIG. 1 is a flowchart presenting the steps that are performed by state-of-the-art prompt generators that are used to remove offensive or profane language and to arrange in a sentence the words corresponding to song parameters selected by the user.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a", "an", and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

The following is a detailed description of embodiments of the disclosure depicted in the accompanying drawings. The embodiments are in such detail as to clearly communicate the disclosure without limiting the anticipated variations of the possible embodiments and may encompass all modifications, equivalents, combinations and alternatives falling within the spirit and scope of the present disclosure. It will be appreciated by those skilled in the art that well-known methods, procedures, physical processes and components may not have been described in detail in the following so as not to obscure the specific details of the disclosed invention.

In the present disclosure, the term automatic content generator 101 is any automatized processes (e.g., artistic process), services (e.g., music composition services) or computer programs (e.g., local or cloud-based program/model) that would result in the creation of "content" based on or following instructions. In embodiments, where the automatic content generator 101 is provided by a computer program, it may include anything from a simple string manipulation to complex AI-powered generators.

To speed up the content creation process and/or reduce the cost associated therewith, in some of the preferred embodiments, the automatic content generator 101 is an artificial intelligence (AI) generator (e.g., provided by a third party) responsive to the instructions to create AI-generated content. The AI generator 101' may be any suitable program/service specialized for various tasks and able to use/process an input prompt (e.g., text-based prompt), which may lead the AI generator 101' to follow instructions comprised therein. In some embodiments, the AI generator 101', may include one or more types of generative AI, which can be, but may not be limited to, generative adversarial networks, diffusion models, transformer models, variational autoencoders, and recurrent neural networks. It will be appreciated that, while current state-of-the-art AI generators 101' are limited to "narrow AI" generators, the method and program described herein would likely be easily or readily adaptable to be used with a general AI or super AI if ever they become available. The AI generator 101' may be integrated into the program product that provides the method proposed herein or may be provided by external service (e.g., cloud service), which may be part of a single computing device, a common integrated system (e.g., integrated platforms or social media platform, various services provided by a common company) or provided by third-party AI generators.

In the present disclosure, the instructions used by the automatic content generator 101 may include any information defining desired parameters of the content to be generated (e.g., may vary based on the type of generated content). In some of the preferred embodiments, the instructions comprise a text-based prompt (e.g., a specific keyword, sentence, or set of instructions provided as input to an automatic generative model to guide it in generating a desired textual output).

In the present disclosure, although the described embodiments focus mainly on songs (i.e., song production, song components, song parameters, AI song generators, etc.), it will be appreciated by the person skilled in the art that the method of filtering and generating a prompt may not be limited to the field of song production. The prompt generation method proposed herein may be used to filter and generate any text-based instructions or prompt that are defined by a collection of parameters regardless of the context or field of technology it is applied to.

The "content" generated by the automatic content generator may be any useful material (e.g., data) such as text, songs, music, music vocals, pictures, videos, components thereof, samples/portions thereof, etc. In one embodiment, the generated content may include one or more song components or at least one portion thereof, which can be but may not be limited to background music, song vocals, singing voice, song lyrics, etc.

FIG. 1 presents an example of a state-of-the-art content generation process, here for generating music-specific content, used as part of an integrated service or as a standalone AI song generation service. The description of FIG. 1 does not relate to the improvements described herein and should therefore not be used to limit the scope of the claimed invention. In some cases, a first step (i) is completed to receive user inputs via a computing device (e.g., via a user interface), where the inputs include prompt keywords selected or provided by a user. A second step (ii) can comprise removing any unauthorized vocabulary (e.g., offensive and profane language) from the user inputs. A step (iii) can be completed to generate a text-based prompt from the authorized prompt keywords. A step (iv) of using the generated text-based prompt as an input of the AI generator to complete step (v) of generating at least one AI generated song components. In step (vi), the at least one generated song component is provided to the user via any suitable interface (e.g., display, speaker, etc.).

The description of FIG. 1 shows the current state of the art and does not relate to the improvements described herein. Therefore, the description of FIG. 1 should not be used to limit the scope the claimed invention.

While alternative processes and steps may be completed to generate the AI prompt, state-of-the-art prompt generation fails to identify and address conflicting information that may violate rules or negatively affect the quality of the generated content. By ignoring the possibility of such conflicting information, the state-of-the-art products will propagate the conflicting information to the AI prompt and therefore through the AI generator and to the generated content. Therefore, once a conflicting information is included in the prompt generations step, it is perpetuated in through the process, and the quality of the resulting content is negatively affected. Therefore, there is a need to process the information considered to generate the prompt to avoid any conflicting information that may lead of violation of rules (e.g., logic rules or filtering rules) to maximize the quality of the generated content and/or to ensure that the generated content remains within desired boundaries.

Figure 2A:
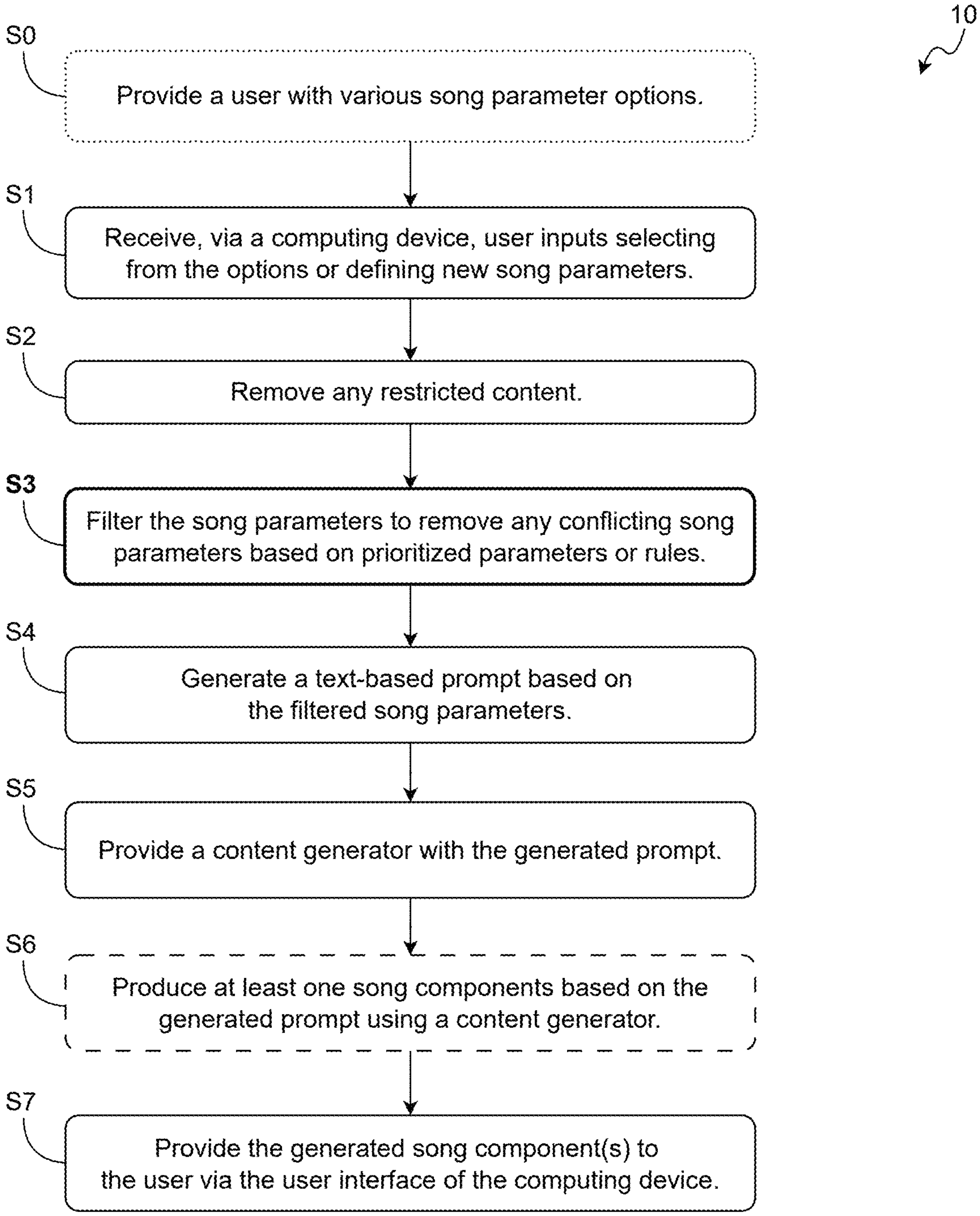
FIG. 2A is a flowchart presenting some of the main steps that may be used to generate an AI prompt by arranging text-based prompt based on song parameters selected by the user after, by removing offensive language, and by filtering any conflicting song parameters or language.

To address and solve these conflict issues, a dedicated filtering step/function S3 has been developed to be used and added to the automatic content generation process 10. An embodiment of the improved automatic content generation process 10 is shown in FIG. 2A, which is present as a flowchart that is but one example thereof. In some embodiments, the automatic content generation process 10 may be used to convert received information (e.g., desired song parameters, such as manual user inputs/prompts or guided inputs) to a text-based prompt free from conflicting information, which is used by (e.g., sent to) an automatic content generator 101 for producing the desired content.

The prompt filtering process may be used to increase both the coherence of the prompt and the quality of the generated content. This filtering prevents conflicting parameters or language by prioritizing one of the conflicting elements, thereby resolving the conflict and preventing it from being perpetuated. This filtering step ensures that the prompt generated is coherent, does not violate the filtering rules and does not perpetuate or induce mistakes down the line. It will be appreciated that the filtering (i.e., solving/addressing) conflicting information comprised in the parameters considered/used to determine the text-based prompt may ensure that the automatically generated content outputted by automatic content generator 101 is not only coherent in itself, but is also much more likely to respect the intended request from the user or the computer-implemented product (e.g., game, app, etc.), which is one of the main advantages of the conflict filtering method, step and/or program presented herein.

While various steps of FIG. 2A are shown as separate steps, it will be appreciated that some of these steps may be performed in a common process. For example, steps S3 and S4 or steps S2, S3 and S4 may constitute sub-steps of a prompt generation process 20 (e.g., see FIG. 2C).

While the steps of FIG. 2A are shown in the order S1 to S7, it will be appreciated that these steps may be performed in alternative orders. For example, step S2 may be completed after step S3 or S4.

It will be appreciated that the "conflicts" or "conflicting information" refers, depending on the embodiment, to one or more of the list consisting of: a plurality of works that conflict with one another (e.g., works of opposite meaning, words that are contextually incoherent, words that belong to different semantic fields or lexical families, etc.), duplicate information (e.g., same/similar words), information violating any established filtering rules or any combination thereof. In a preferred embodiment, the "conflicts" and the "conflicting information" are limited to elements that conflict with defined or pre-established filtering rules 226 and/or duplicate information/parameters in order to avoid limiting the creativity of the users. In other words, the filtering step is limited to minimal (essential) features so that the user is still able to generate content that includes "contrasting" concepts, which could otherwise be identified/flagged as conflicting concepts and filtered. It will be appreciated that duplicate information of repeated similar parameters may be considered as one type of conflict since the repeated or duplicate information may confuse the automatic content generator 101 and/or negatively affect the quality of the resulting content generated thereby. Therefore, conflicting rules may be used to filter such conflicting information to ensure that parameters and information is not unnecessarily repeated, thereby lowering the likelihood of confusing the automatic content generator 101 and increasing the average quality of the generated content.

In some embodiments, the filtering rules 226 may include any one of a priority rule, an exception/exclusion rule, a logic-based rule, or a combination thereof. A priority rule may be any rule that will indicate which of the plurality of conflicting information (concept or words) will be prioritized over the others. For example, a priority rule, when applied by the conflict filter may ensure that a specific desired/allowed characteristic (e.g., a music genre, a song theme, etc.) of a song component (e.g., lyrics, background music, etc.) is selected over any alternative undesired/restricted characteristic. In one of the many possible embodiments, the filtering rules 226 may include a priority rule that prioritizes a specific music genre, such as a Rap song for example, and would effectively ensure that the prompt does not ask for any other song genre (e.g., Rock, Hip-Hop, Pop, Classical, Jazz, Country, R&B, Electronic, K-Pop, Folk, etc.) than a Rap song. This may be achieved by first determining if the information used to generate the prompt include any other song genre (other than "Rap") and then filtering out or repurposing that information to address/solve the identified conflict.

In some embodiments, the filtering rules may be priority rules that may be defined or enabled to ensure that a specific class or category of parameters be limited to a specific prioritized concept, theme, keyword, or any collection thereof. In one embodiment, the priority rules may be used to ensure that no conflicting parameters affect (e.g., replace, supersede, change the scope or meaning of, etc.) the prioritized parameter. The filtering of the selected parameters to be used for generating the text-based prompt may use one or more priority rules to ensure that the generated prompt does not unnecessarily repeat information.

In one embodiment, the filtering rules 226 may include priority rules using some form of blacklisting and/or whitelisting. For example, if a rule requires that the music genre be limited (e.g., whitelisted) to a few genres or one specific genre, say Rap music, or any other music genre (e.g., blacklisted) that would be identified would be removed from the prompt. Therefore, the generated prompt may be structured in a formulation that resembles and starts by: "Generate a Rap song about ( . . . )".

Alternatively, when another music genre is detected (e.g., in the user's own manually entered keywords), say country music, the conflict filter 223 may repurpose this information, thereby avoiding the complete loss of the user's desired input (here "country music"). For example, the conflicting music genre may be used to define a music theme or an action, such that the generated prompt may take a form similar to "Generate a Rap song about the music genre of country music ( . . . )" or "Generate a Rap song about a [user's name] singing country music ( . . . )" or "Generate a Rap song about how country music is [adjective of choice] ( . . . )".

In one embodiment, the filtering rule may alternatively be a priority rule, which may remove specific keywords, only when one of the prioritized keywords is present. For example, other music genres may be filtered out only when the word Rap is detected or when the Rap music genre is selected.

One possible way of defining and using a priority rule may comprise:

i—Defining various collections (e.g., semantic fields) of parameters (e.g., individual words or sequence/combination of words) related to a common aspect or concept of the content to be generated. For example, the collection of parameters may include a list of parameters associated with or defining a music genre, song style, etc., and may define a list of synonymous parameters/information (e.g., listing various wording and ways a same parameter may be repeated or duplicated).

ii—Defining a priority level of one or more of the parameters for each of the various collections. In one embodiment, one parameter to be prioritized may be identified for each of the previously defined collections of the parameters. For example, in a collection of music genre parameters, one particular music genre (e.g., Rap) may be prioritized over the rest of the parameters of the corresponding collection of parameters. In another embodiment, each parameter may be sorted in order of desired priority, such that, when a specific parameter is detected, it may take priority only over parameters that have a lower level of priority.

iii—Detecting each parameter that is part of any one of the defined collections of parameters.

iv—Filtering the parameters based on the defined priority level. For example, the filtering may comprise first identifying the parameter having the highest priority level, and then using the rest of the corresponding collection of parameters has a blacklist to identify and remove parameters with lower priority. In another example, the filtering may comprise first comparing the priority of two parameters of a common collection of parameters to keep the parameter with the highest priority level and process (e.g., repurpose or delete) the parameter with the lowest priority level, and secondly repeating, for each of the following parameters of the same collection of parameters, the comparing step between the next parameter and the parameter having the highest priority level (i.e., of the previous comparing step) and of the common collection of parameters.

Figure 2B:
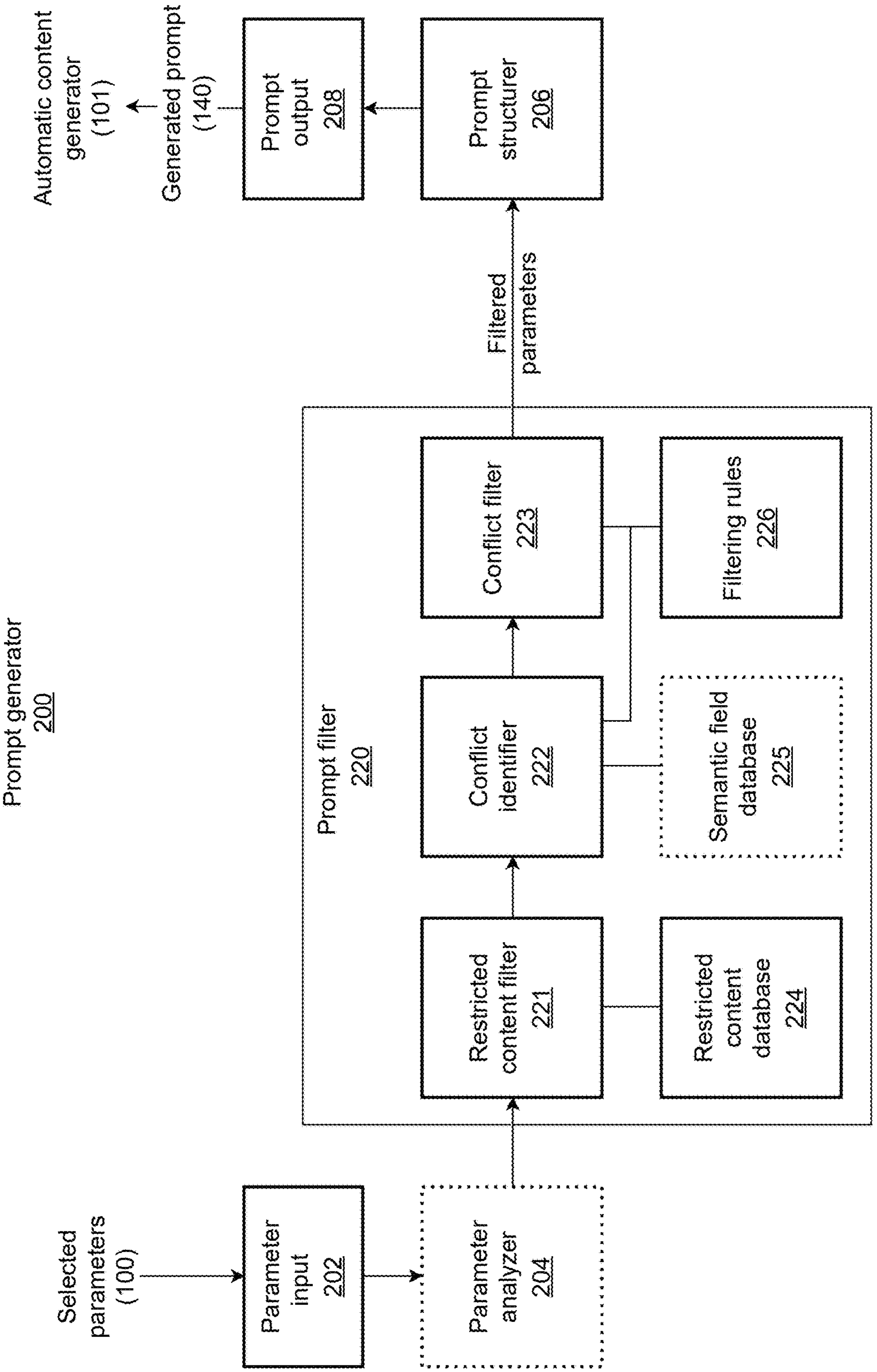
FIG. 2B is a block diagram presenting various software components that may be used to provide one of the embodiments of the prompt generator and prompt filter thereof.

Reference is now made to FIG. 2B that shows a block diagram presenting various software components that may be used to provide one of the various the embodiments of the prompt generator 200 and prompt filter 223 thereof.

In one embodiment, the prompt generator 200 may have a parameter input 202 receive selected parameter 100 (e.g., song parameters selected or provided by the user) and a prompt output 208, which may be connectable to the automatic content generator 101 to provide the generated prompt 140 thereto.

In some embodiments, the prompt generator 200 may consist of a prompt filter 220 and a prompt structurer 206. The prompt filter 220 may provide the elements enabling the filtration of the received parameters 100, which may comprise a conflict identifier 222 for determining that the received parameters include one or more "conflicts" and a conflict filter 223 for processing the identified conflicting parameters according to the filtering rules 226 and "resolve" the conflicts. In one embodiment, the conflict identifier 222 determines the present of a conflict based on selected parameters, the filtering rules 226, or a combination thereof. The prompt structurer 206 may be any state-of-the-art program code that enables the filtered parameters to be organized in a structured and coherent text-based prompt.

The prompt generator 200 may include a restricted content filter based on a restricted content database 224. This step may be completed at any point in the prompt generation process or thereafter.

Optionally, the prompt generator 200 may further include a parameter analyzer 204 that may be used to preprocess the received selected parameters 100 or a semantic field database 225 for use by the conflict identifier 222.

The semantic database 225 may be used to store or access various semantic fields comprising collections of semantically related words, which belong to similar or opposite general topics or domains, concept aspects, meanings, etc. For example, words of a semantic field may share similar meanings or, alternatively, may share opposite meanings. Semantic fields may be used to group various words having category relationships, part-whole relationships, habitual co-occurrences, functional (e.g., cause and effect) relationships, etc.

It will be appreciated that the semantic field may be predetermined (e.g., downloaded from an external semantic database), defined by the prompt generator 220 and/or periodically updated.

In one embodiment of the prompt filter 220, the conflict identifier 222 may first map out the various song parameters 100 of corresponding information identified by the parameter analyzer 204 to one or more semantic fields of the semantic database 225 before detecting the various conflicting prompt based on compatibility or incompatibility rules between the various semantic fields.

In one embodiment, the prompt generator 200 may comprise a parameter analyzer 204, here a song parameter analyzer, used for determining various information associated to each one of the received and considered song parameters. The information extracted from each received song parameters may then be used by other functions of the prompt generator 200. For example, the analyzer 204 may determine various fields associated with a song parameter such as the corresponding song component (e.g., background music, singer's voice, lyrics, music video, etc.), the song's theme (e.g., the subject of the song), the music genre (e.g., Rock, Jazz, Classic, Rap, Electronic, etc.), the song's style (e.g., classified sub-genres (hard rock, punk, swing, bebop, jazz fusion, etc.), rhythm, instrumentation, harmony, beats per minute, mood, a reference to the style of specific artists, etc.), any other characteristics of the song, or any combination thereof. It will be appreciated that, while in the context of song production the parameter analyzer 204 may be used for determining song-specific information, the parameter analyzer 204 may be adapted for any desired field of interest so as to determine any information pertinent thereto. The parameter analyzer 204 may extract one or more keywords comprised in or associated with each one of the analyzed parameters.

It will be appreciated that the prompt filtering step described above may be implemented in any prompt generation process, such as any automated AI prompt generation. For example, it may be used in any state-of-the-art music generation application.

Figure 2C:
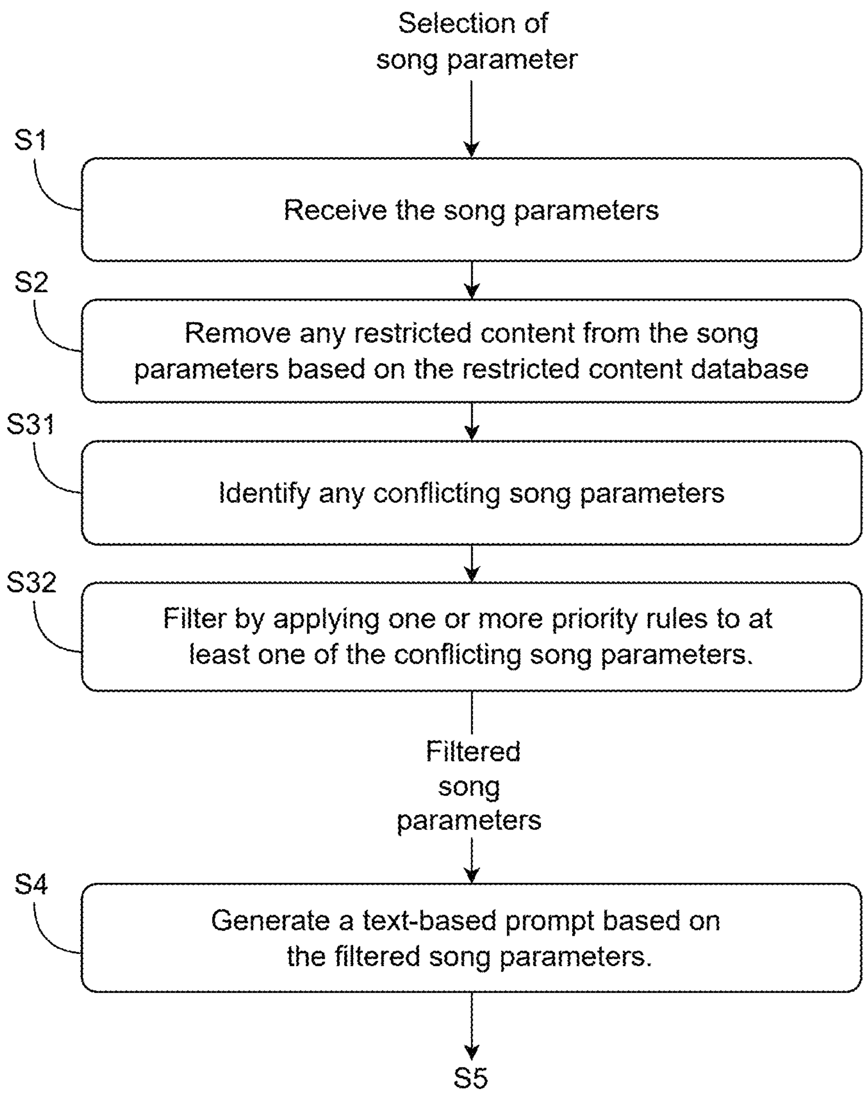
FIG. 2C presents a flowchart of one possible embodiment of the filtering process for filtering the input parameters to remove any conflicting parameters based on the priority filtering rules.

FIG. 2C presents a flowchart of possible embodiments of the filtering process that may be provided by the prompt generator 200 of FIG. 2B for filtering the input parameters 100 to remove any conflicting song parameters based on the priority rules. In one embodiment, the prompt generator 200 may complete the steps of: (S1) receiving the selected song parameters (e.g., song parameters selected or provided by the user); (S2) automatically removing any restricted content (e.g., profane or offensive language) from the song parameters, e.g., with the restricted content filter 221, based on the restricted content database 224; (S31) automatically determining the presence of any conflict between a plurality of song parameters, e.g., with the conflict identifier 222; (S32) automatically applying the filtering rules 226 to filter the conflicting parameters, e.g., with the conflict filter 223; (S4) automatically generating the text-based prompt, e.g., with the prompt structurer 206.

Figure 3A:
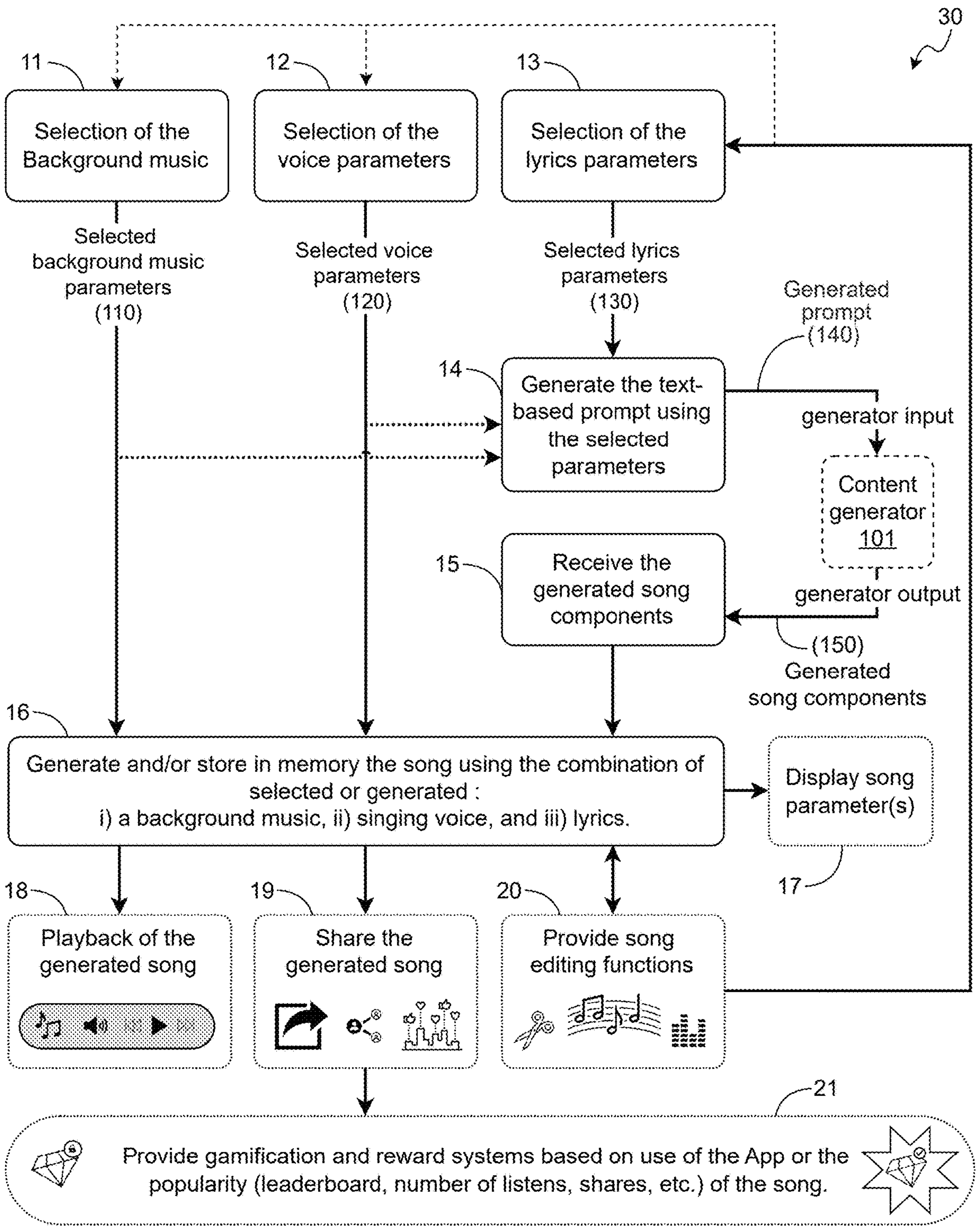
FIG. 3A presents a flowchart of one embodiment of an automated content production method for generating one or more song component based on song parameters selected by the user and using a prompt generator, wherein AI programs are used to generate at least one song component based on an AI prompt structured and defined by the prompt generator using the selected song parameters (e.g., background music parameters, voice parameters and/or lyrics parameters) filtered for any conflicting parameter.
Figure 3D:
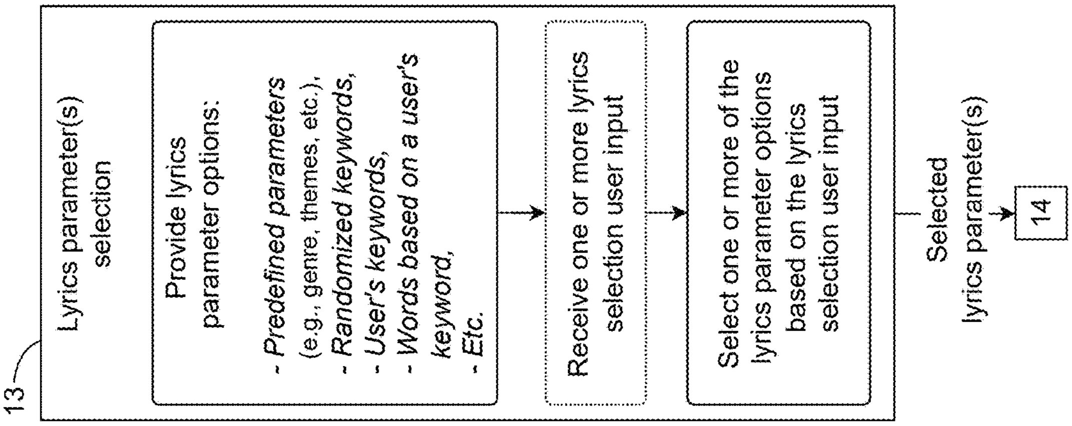
FIG. 3D presents various steps that may be completed to define/select the lyrics parameters and/or lyrics by interacting with the user.
Figure 3C:
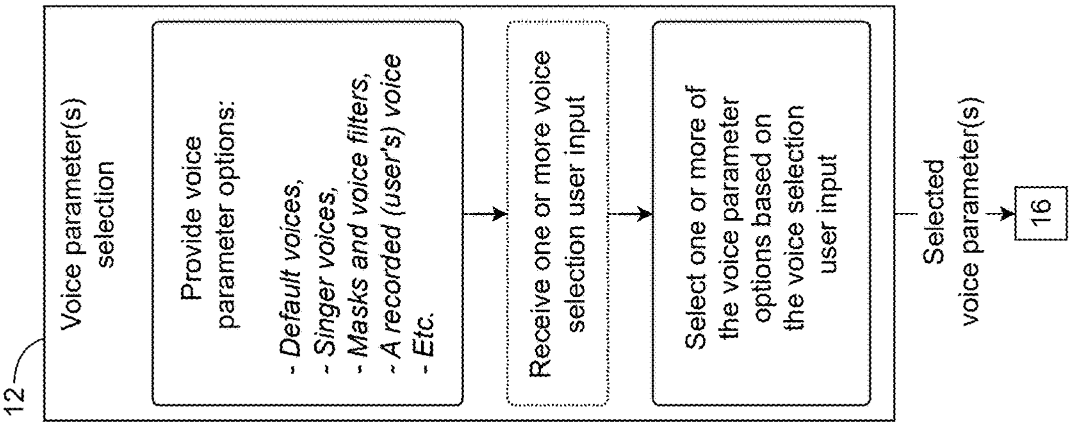
FIG. 3C presents various steps that may be completed to define/select the voice parameters and/or select a voice by interacting with the user.
Figure 3B:
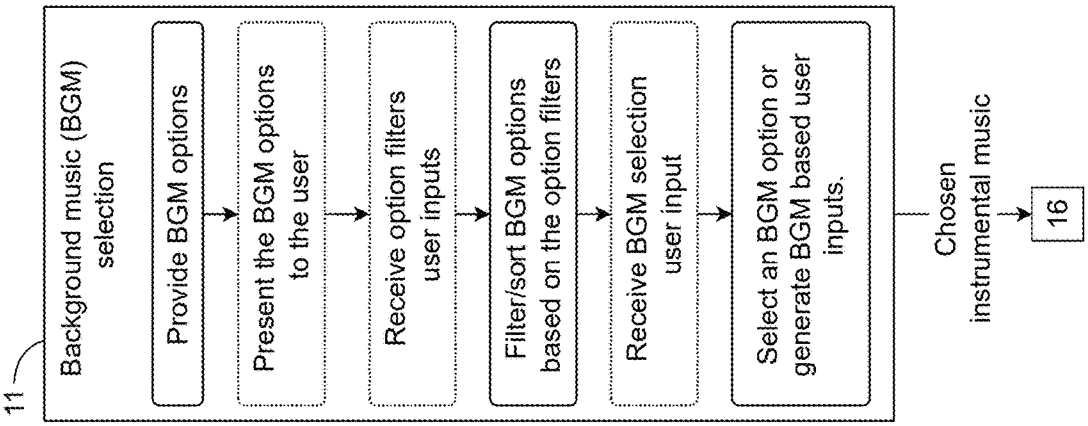
FIG. 3B presents various steps that may be completed to define/select the background music parameters and/or select a background music by interacting with the user.

FIGS. 3A, 3B and 3C show examples of automatic song generation programs 30 for generating at least one song parameter using a prompt generation process that includes and provides the prompt filtering step.

FIG. 3A presents a flow chart of an automated song generation program (App) 30 wherein the prompt filtering has been implemented to improve the quality and accuracy of the generated output. In this embodiment, a user completes the song parameter selection 11, 12, 13 by selecting from options provided by the App or by providing (e.g., type in or upload) one or more song parameter, which may include, but may not be limited to, at least one selected background music parameter 110 (e.g., a selected background music or information defining some characteristics of the desired background music to be generated), at least one selected voice parameter 120 (e.g., information defining characteristics of the desired singer voice to be generated), at least one selected lyrics parameter 130 (e.g., lyrics provided by the user and/or information defining characteristics of the desired lyrics to be generated), at least one music video parameter (e.g., information defining characteristics of the desired music video to be generated), at least one parameter defining an album or song cover art, or combination thereof. Once the parameter selections 11, 12, 13 have been completed, the selected parameters are used in step 14 by the prompt generator 200 to generate the text-based prompt 140. It is at this stage 14 of the process 30 that the prompt filtering process (e.g., see FIG. 2C) may be completed to ensure that the occurrence of conflicting concepts and language is reduced.

In the embodiment of FIG. 3A, once the text-based prompt 140 has been produced, it may be used by an automatic content generator 101 (e.g., an AI generator) to generate at least one of the one or more desired song components 150 according to the prompt 140. It will be appreciated that the automatic content generator 101 (shown in dashed lines) may be provided by a third party such that it does not have to be integrated into the App 30. Alternatively, it may be integrated into the App 30 or may be provided by a multiplatform environment (e.g., a tech conglomerate). The automatic content generator may be selected from a list of various specialized AI generators depending on which song parameter is to be generated thereby.

For example, when the App 30 and the prompt 140 requires lyrics to be generated, the selected AI generator 101 may be a natural language model (NLM). The NLM can be, but may not be limited to, the AI lyrics generator; a thematic lyric generation model; a contextual lyric synthesis model; and a large language model trained on lyric corpora.

In the context of a song generator program, depending on the selected parameters 110, 120, 130 considered in step 14 to produce the prompt 140, the generated song components 150 may be any one of generated background music, generated song vocals, generated lyrics, generated complete song, generated music video, etc.

In the context of FIG. 3A, the AI generated song component(s) 150 outputted by the AI generator 101 is received 15 by the App 30 to be processed 16 thereby. The App 30 may process 16 the received song parameters by locally generating a song using the received generated song component 150 and one or more of the selected parameters (e.g., the App may merge the generated vocals with the selected background music). It will be appreciated that, in step 16, the song (final content) may be generated using only song components automatically generated (e.g., AI-generated song components), using only the selected song parameters (i.e., without any AI-generated song components or content) or any combination thereof (e.g., using both AI-generated song components and non-AI song components (e.g., manual user-provided song components or in app predefined song components selected by the user)). While step 16 may be completed locally by the App, it may also be completed externally (e.g., by a cloud server or a third-party service). The App 30 may process 16 the received song parameters by simply storing the generated content (e.g., complete song, or song parameters) in memory 415.

Figures 6A, 6B, 6C:
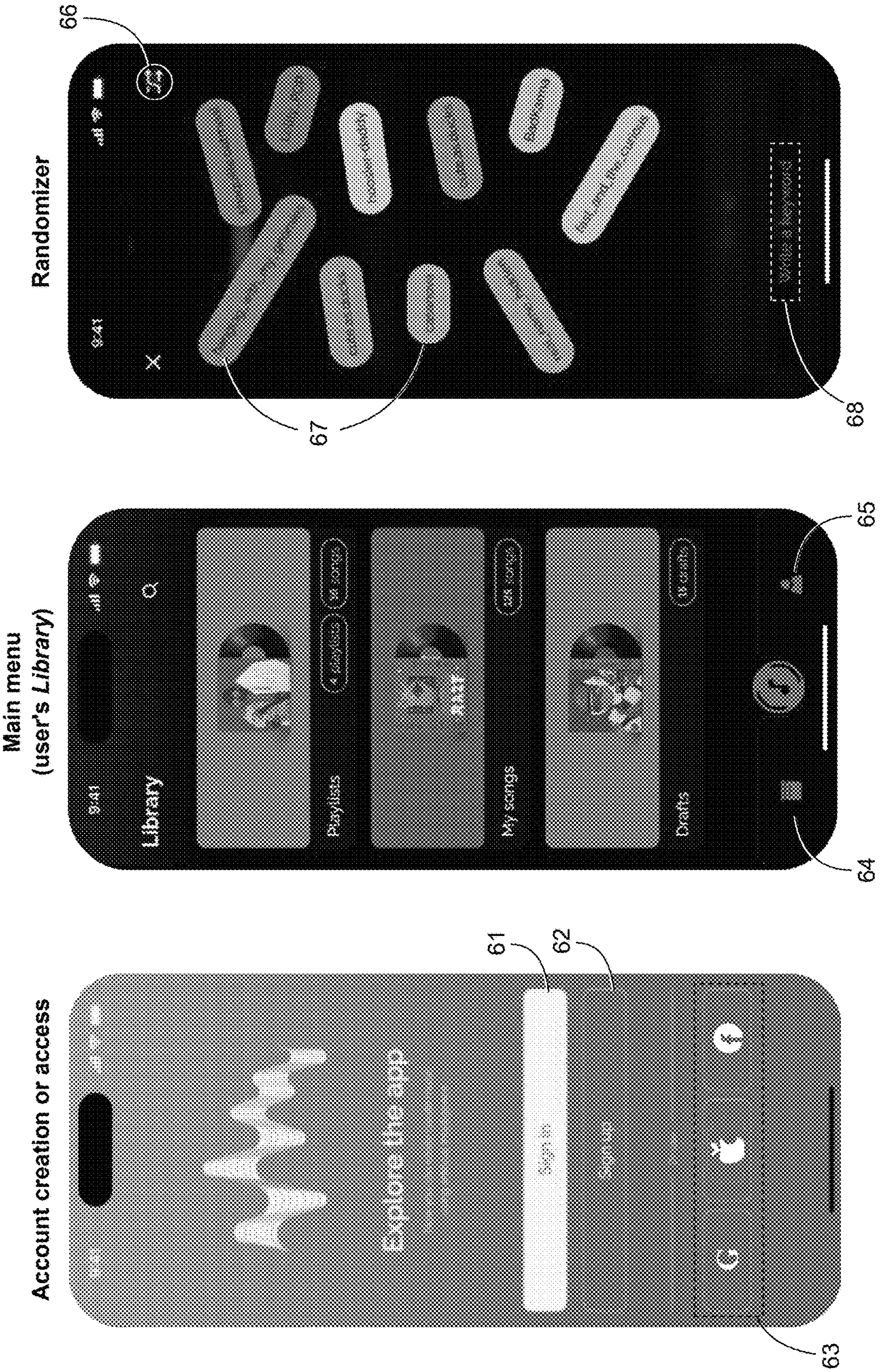
FIG. 6A-6V presents various user interface pages of the computer program product, some corresponding to one of the software modules of FIG. 5C.
Figure 6E:
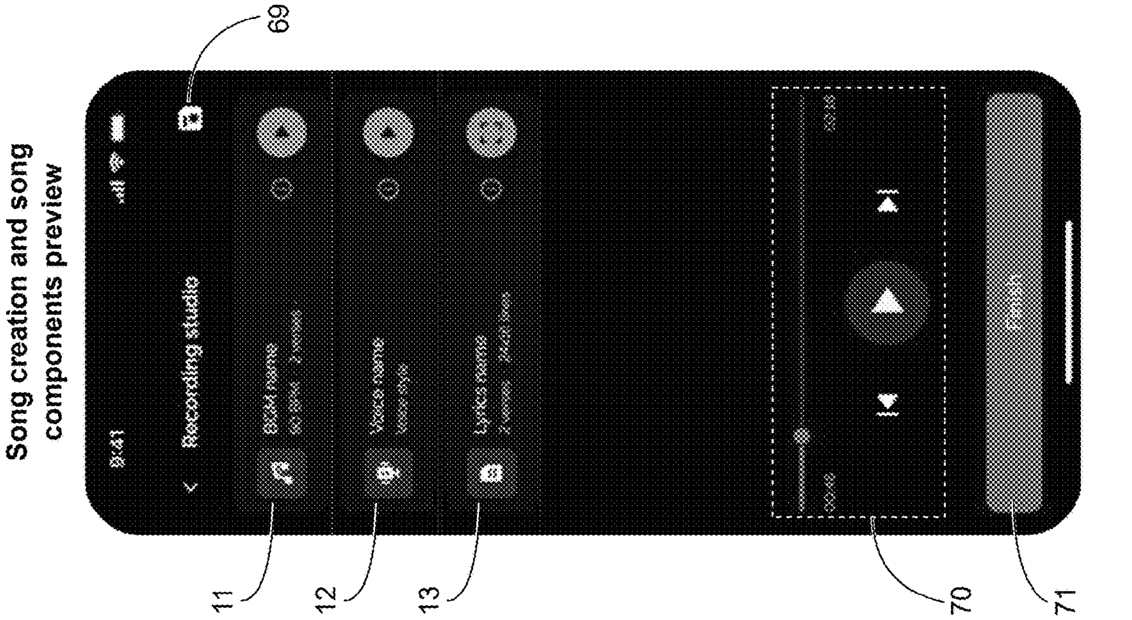
Figure 6D:
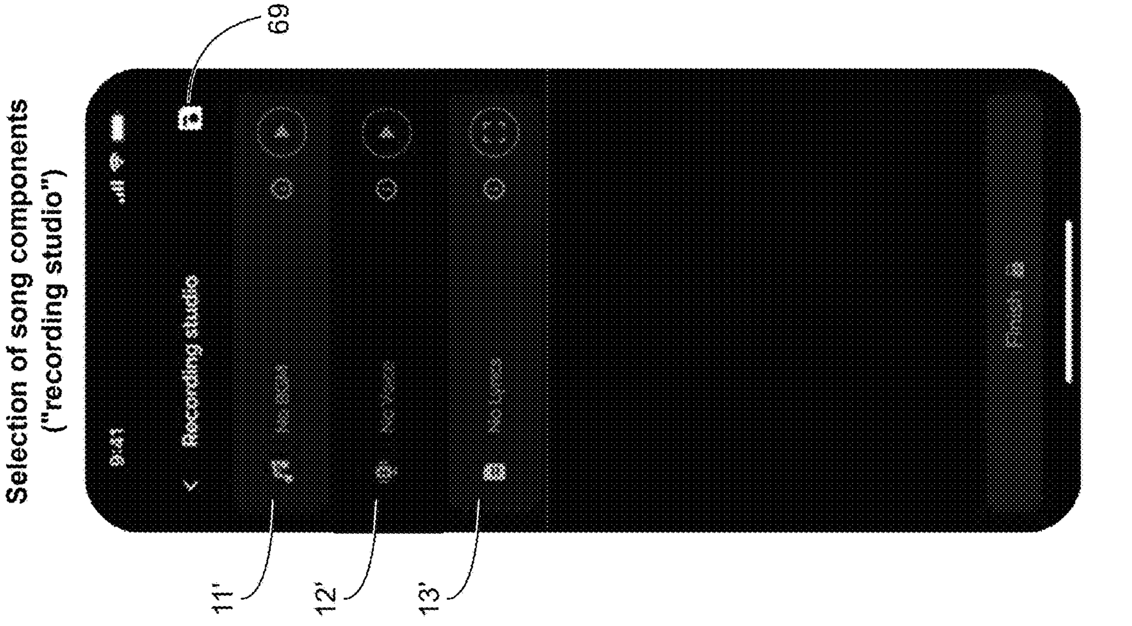
Figure 6F:
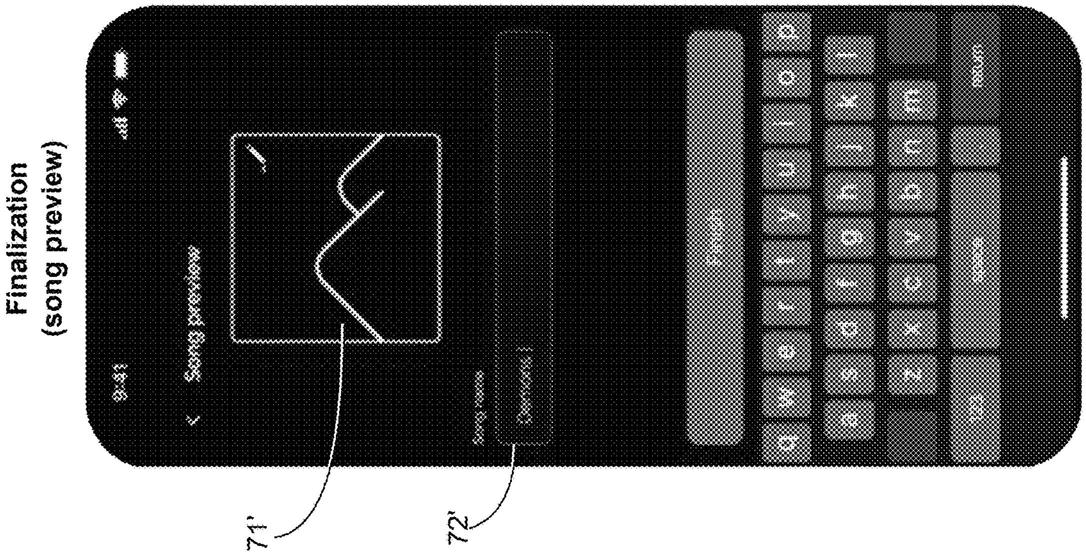
Figure 6G:
Figure 6H:
Figure 6J:
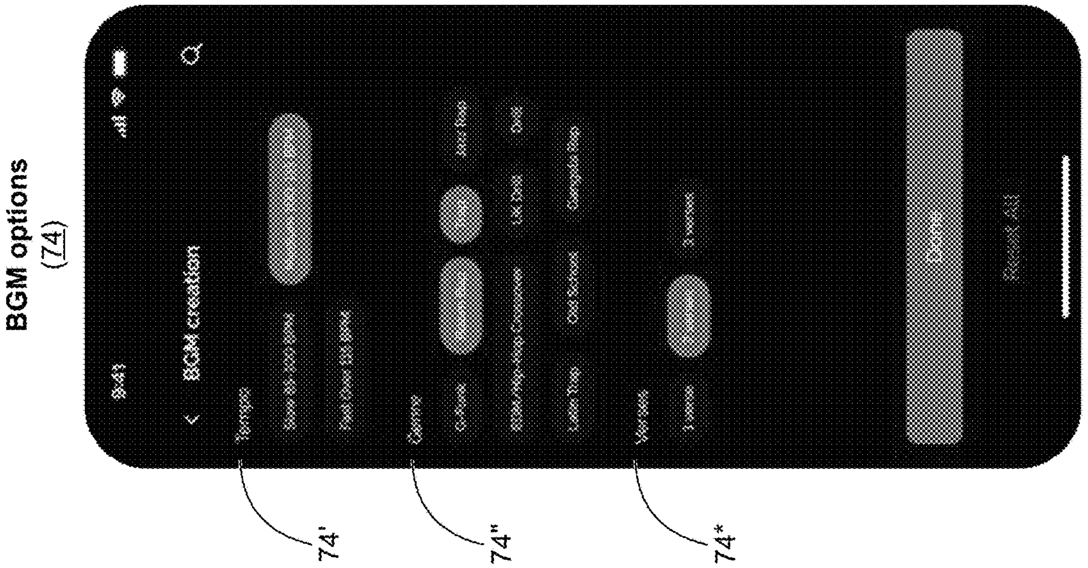

Additionally, the App 30 may provide various features including, but not limited to, a user interface (UI) to interact with the user and display various functions (e.g., see FIGS. 6A to 6V); a playback function 18 to enable the user to play the music using speakers 412 (e.g., smartphone speakers, Bluetooth®, a headset, etc.) to listen to any desired content (e.g., the newly generated song); sharing options 19 to share any desired content over the internet to any recipient or on any platform (e.g., social media); a song editing tool 20 to allow the user to modify any part of the generated song or song component thereof; gamification and/or reward system 21 to engage the user by enhancing the user experience and retain or increase usership.

Gamification (interactive user interface) may be provided by various user interfaces, features and game mechanics which may include, but may not be limited to: a slot machine interactive user interface where user/players can push buttons or slide a leaver down on the display under a plurality (e.g., three of more) spinning wheels to randomly generate or automatically select song parameters (e.g., various specific words) or to unlock rewards (e.g., in-app currency, medals, etc.), which may be used to interact with the gamified functions (e.g., in-App game features) of the App 30; a Rap battle interactive user interface (e.g., challenge a friend, take up another (random) singer (user), leaderboard, etc.); pinball interactive user interface to randomly generate or automatically select song parameters (e.g., various specific words) or to unlock rewards by hitting pinball bumpers; bowling interactive user interface displaying a bowling alley with bowling pins having each corresponding to a song parameter or a reward, which is selected or unlocked when knocked down by a bowling ball controlled by the user (e.g., by sliding a finger over the screen); word shaker interactive user interface (e.g., see FIG. 6C for an example) that will display various randomized song parameters (e.g., song themes) that may drift (e.g., fall down) on the display; and/or a balloon or bubble popper interactive user interface displaying drifting (e.g., rising through the display) balloons or bubbles that reveal one or more randomized words when selected (e.g., popped) by the user.

FIG. 3B presents various steps that may be completed as part of one embodiment of the background music parameter selection 11 to define/select the background music parameters and/or select a background music by interacting with the user. FIG. 3C presents various steps that may be completed as part of one embodiment of the voice parameter selection 12 to define/select the voice parameters and/or select a voice by interacting with the user. FIG. 3D presents various steps that may be completed as part of one embodiment of the lyrics parameters selection 13 to define/select the lyrics parameters and/or lyrics by interacting with the user. In these embodiments, various song parameter options are provided to the user to be selected thereby. The background music options may include various soundtracks, complete songs or parameters defining the background music to be generated. The steps shown in the dotted line are considered to be optional in some embodiments.

Figure 4:
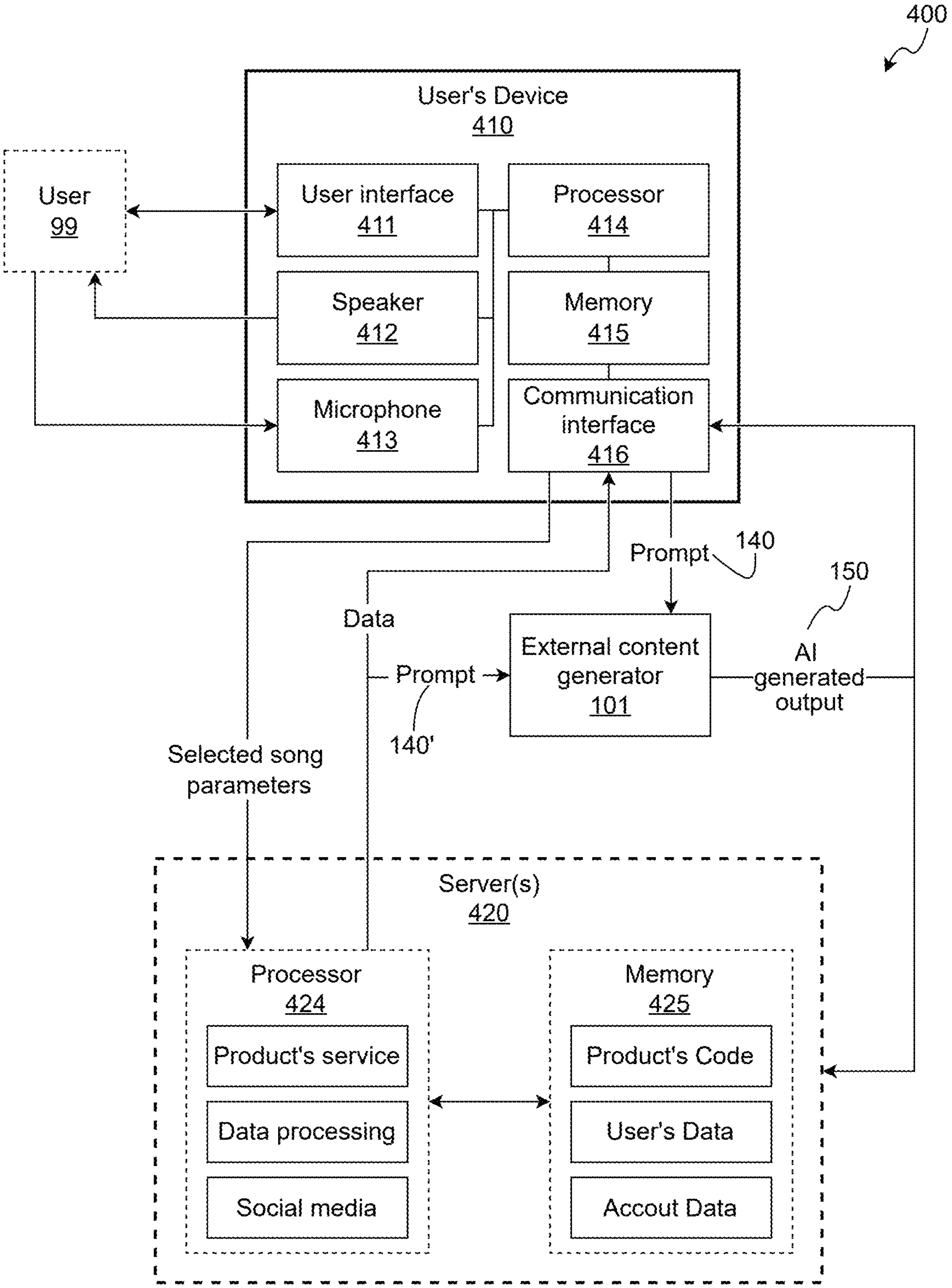
FIG. 4 presents a block diagram of various hardware components used to provide the prompt generator or song generator product.

FIG. 4 presents a block diagram of various hardware components used to provide the prompt generator or song generator product or system 400 for use by a user 99. The song generator product 400 may include a user's device 410 (i.e., a computing device, e.g., a smartphone, a laptop, a VR headset, etc.) and may be connected to an external content generator 101 as part of a system. The song generator product 400 may optionally be partially provided by one or more remote (e.g., cloud) servers 420.

In one embodiment, the user's device 410 may include: (i) a user interface 411 (e.g., keyboard and display, interactive/tactile display, etc.) to receive various user inputs (e.g., parameter selection and/or user-provided keywords) and, optionally, to provide the user with parameter options (e.g., song parameter options); (ii) memory 415 for storing the program code of the program (application); (iii) a processor 414 for executing the program; (iii) a communication interface 416 (e.g., ethernet, Wi-Fi, Bluetooth®, etc.) for exchanging data with the content generator 101 and, optionally, with the server 420; (iv) a speaker 412 for playing the generated content (e.g., music, voice or music); and (v) a microphone 413 for recording sounds (e.g., a user's voice).

The server 420 may include processors 424 and memory 425. The server 420 may also include a communication interface (not shown).

The various embodiments of the proposed method can be implemented as program code (e.g., algorithms) stored in memory 415 or 425 so as to be performed by the processor 414 or 424. The processor may be connected to and exchange data with the memory. The processor can receive and execute instructions from the memory and may receive data from any other components of the system (e.g., via the communication interface 416). In one embodiment, the program code may be stored in a remote memory (e.g., a remote server or database).

The memory 415 or 425 may store additional data, such as user's data, account data, data of the generated content, etc.

The user's device 410 and/or the server 420 may comprise one or more processors 414 or 424, which may be any suitable general-purpose programmable hardware (central processing unit, microprocessor, DSP, FPGA, etc.). While the processor 414 or 424 may be shown as being unitary in FIG. 4, the processor may be multicore, or distributed (e.g., a multiprocessor) in some embodiments.

It will be appreciated that processors 414 or 424 and memory 415 or 425 may be provided by an external or remote computing device, such as a smartphone running a dedicated application or a remote server 420 (e.g., cloud service). In this embodiment, the user's device may only require a user interface 411 and a communication interface 416.

Figure 5A:
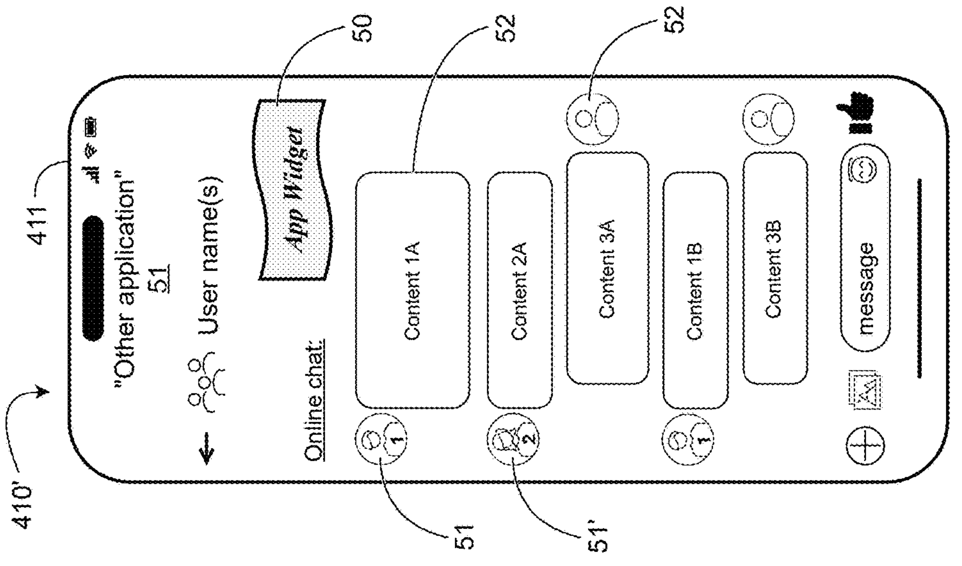
FIG. 5A presents a schematic representation of the App's widget overlaid over another application for quick access and use in combination with the other application and information thereof.

FIG. 5A shows a schematic representation of the App using the interface 411 of the user's device 410 to provide a widget 50 overlaying another application 51 for quick access and use in combination with the other application and information thereof. In the example of FIG. 5A, the "other application" 51 may be a group chat including the user 52 and one or more correspondents 51, 51' that may have discussed various topics. The contextual information comprised in this group chat may be extracted from the content of the various messages 52, from the user's names, the title of the chat, etc. To enable this feature, the App may first be required to be granted access by the user to the other apps 51 and the contextual information thereof.

It will be appreciated that the contextual information may be any information that may be identified, extracted and used for the purpose of personalizing the song parameters used for generating the prompt. The contextual information includes, but may not be limited to, the personal information of any intervening party. For example, this feature may allow the user to extract useful information from a separate App (e.g., social media) to automatically or quickly personalize the generated song by automatically personalizing the song parameters used for generating the prompt. In one embodiment, the contextual information may be used to provide the user with a personalized and contextually relevant set of song parameters to choose from. In one embodiment, the contextual information may be the content (e.g., lyrics) of a song sent by another user or an online correspondent.

Figure 5B:
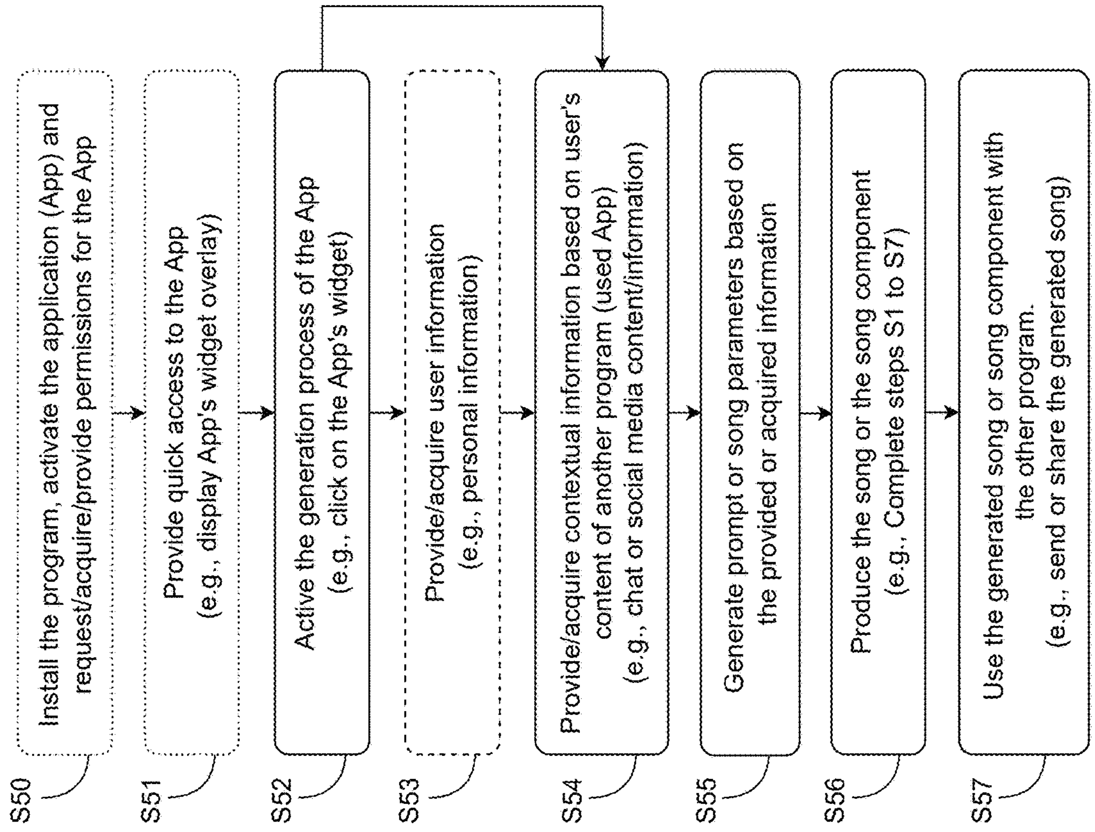
FIG. 5B shows a flowchart of one possible embodiment of how the program can be used in combination with and/or integrated into another application to enhance the user experience and provide additional functions.

FIG. 5B shows a flowchart of one possible embodiment of how the App 30 may be used in combination with and/or integrated into another application 51 to enhance/personalize the user experience and provide additional functions. In one embodiment, the method may include any suitable combination of the optional step S50 of installing the program, activate the application (App) and request/acquire/provide permission for the App; optional step S51 of providing quick access to the App (e.g., display App's widget overlay); step S52 of activating the generation process of the App (e.g., click on the App's widget); optional step S53 of providing/acquiring user information (e.g., personal information); step S54 of providing/acquiring contextual information based on user's content of another App 51 (e.g., chat or social media content/information); step S55 of generating prompt or song parameters based on the provided or acquired information; step S56 of producing the song or the song component (e.g., complete steps S1 to S7); and step S57 of using the generated song or song component with the other program (e.g., send or share the generated song).

Figure 5C:
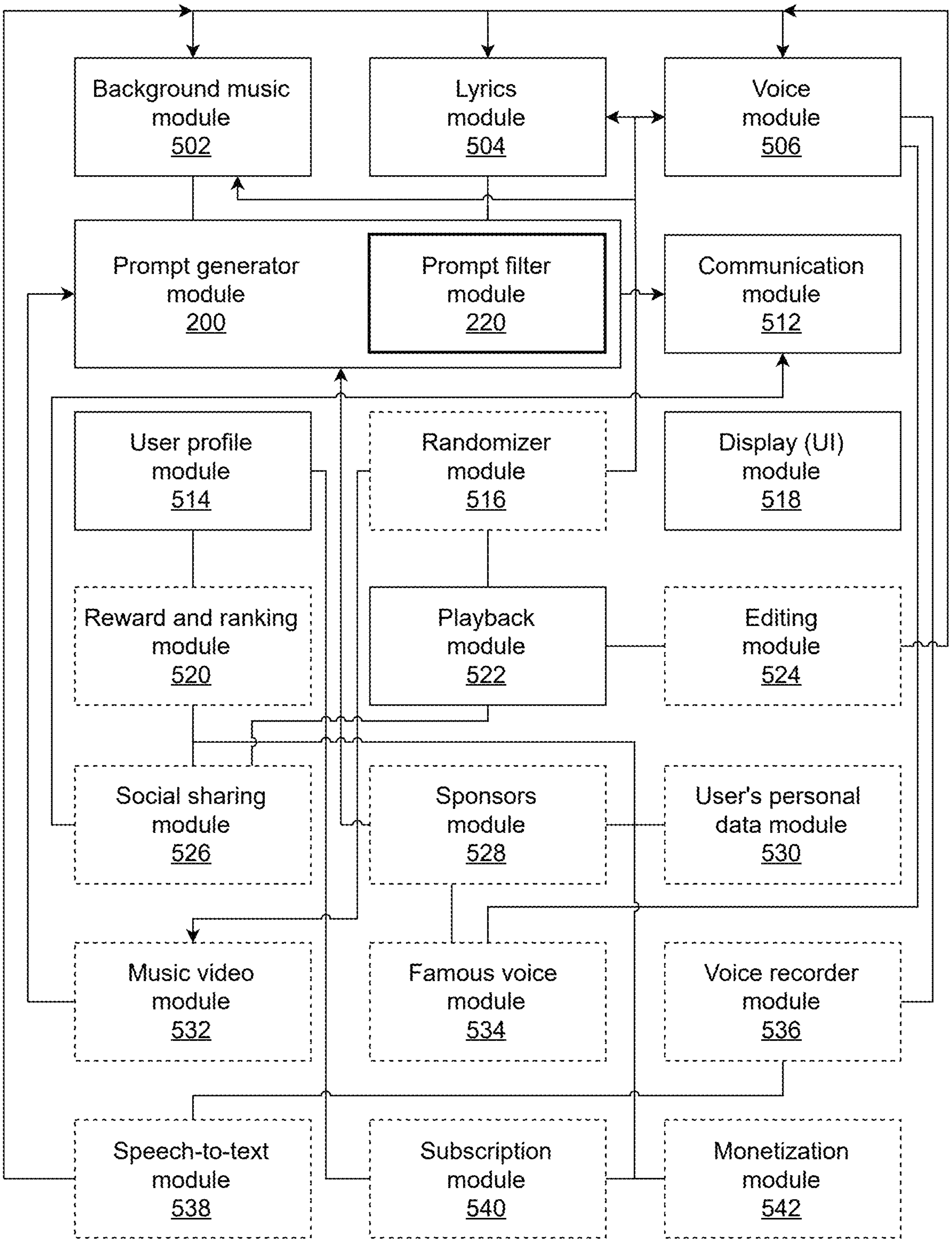
FIG. 5C presents a block diagram representing various software modules that are provided by one embodiment of the computer program product presented herein.

Reference is now made to FIG. 5C, which shows a block diagram including various software modules of some embodiments of the App 30 that uses the filtering process to generate prompt for use by the automatic content generator. It will be appreciated that some software modules may be necessary to provide a functional App, while others may be additional (dashed lines) and used to provide additional features thereto. The various software modules may be provided at least by the processor 414, 424 and memory 415, 425 by various embodiments of the user's device 410 or of the song generator system 400. The interactions between the various modules may vary depending on the embodiment and the functions/features to be provided by the App (e.g., depending on how the information from one module may be used by another).

Figure 6I:
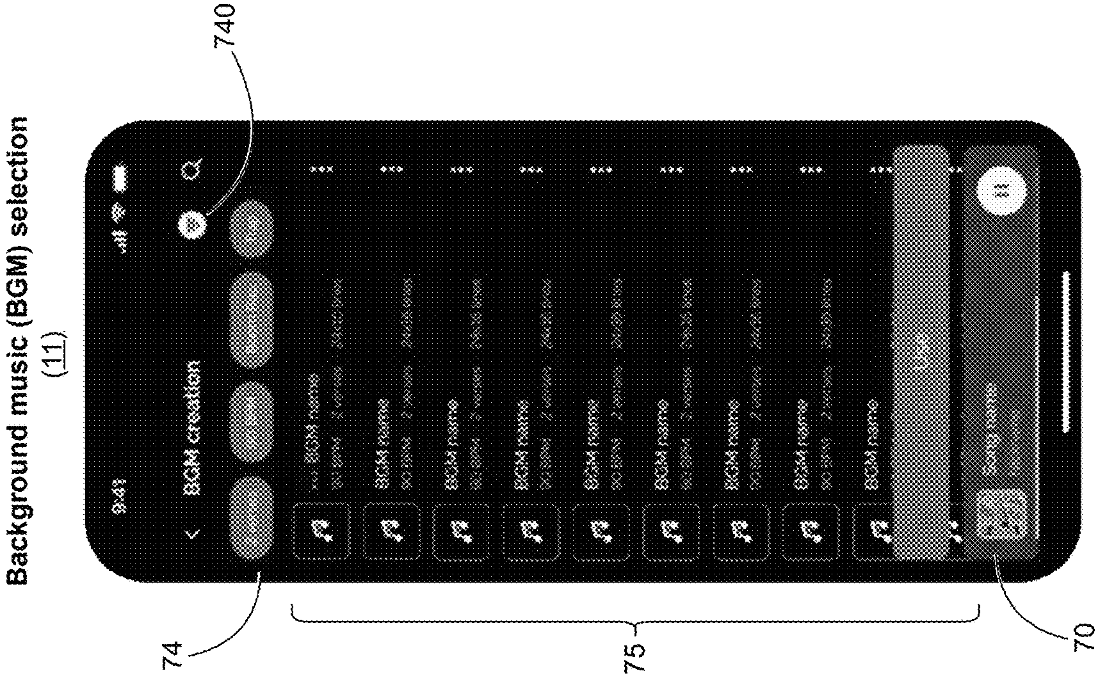

The background music module 502 may be a software module dedicated to anything related to the background music (e.g., providing choices, selection, generation, managing, storing, uploading of background music parameters), which may provide the user interfaces shown in FIGS. 6I (i.e., a background music selection interface 11 showing various background music 75, option selection filters 740, selected background music parameters 74) and 6J (i.e., background music parameter selection interface 74 for selecting a music tempo 74', music genre 74", a number of verses 74*, etc.) for example.

Figure 6K:
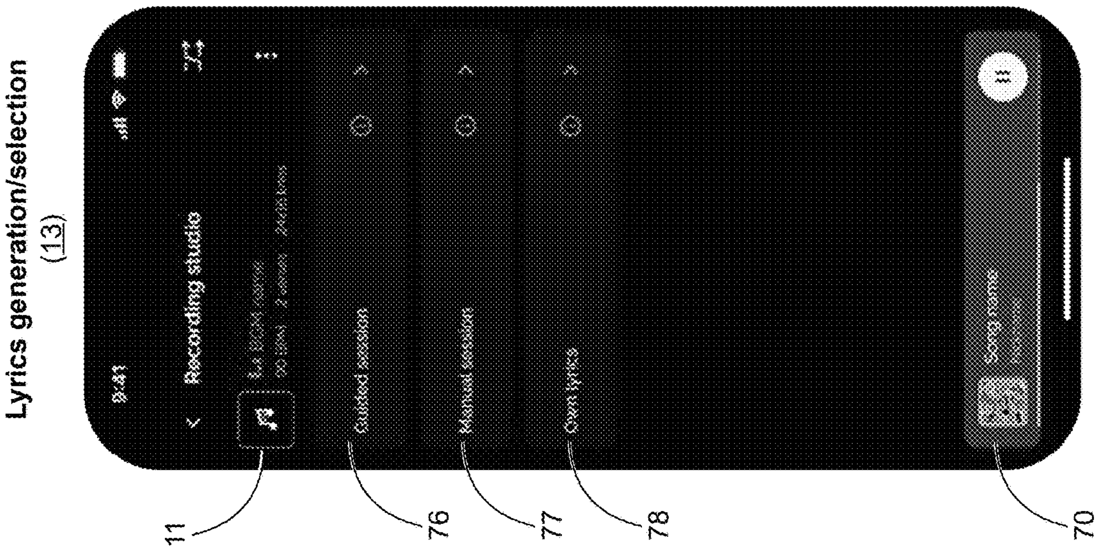
Figure 6L:
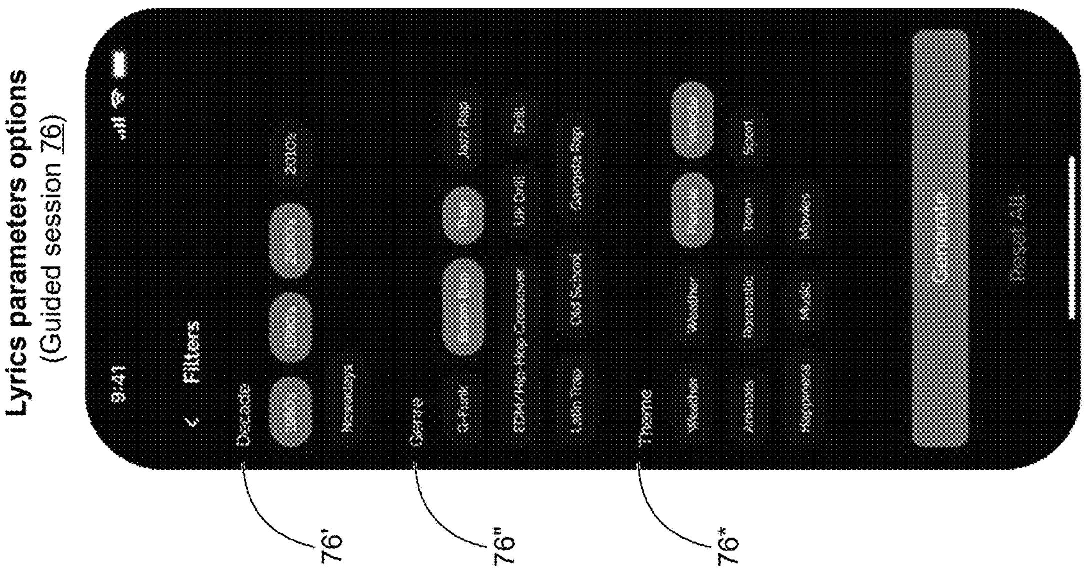
Figure 6N:
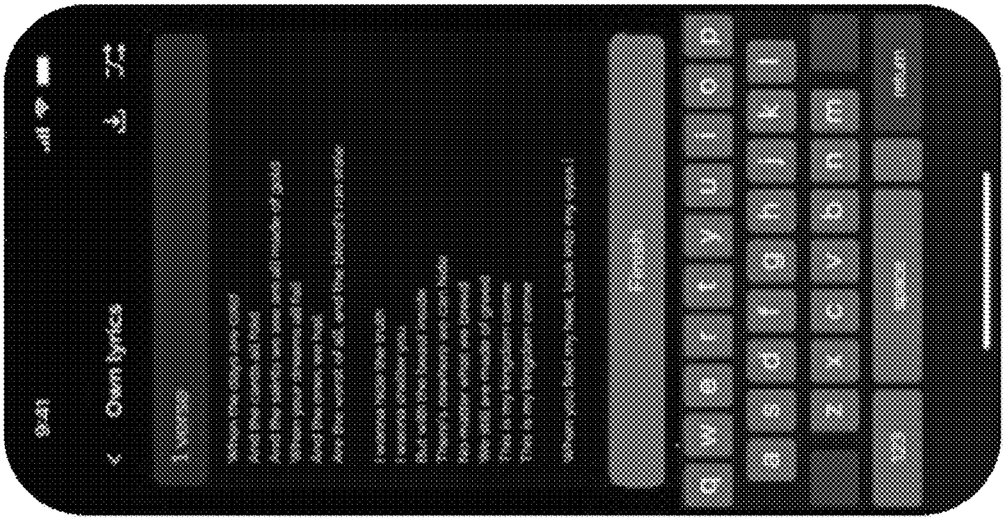
Figure 6M:
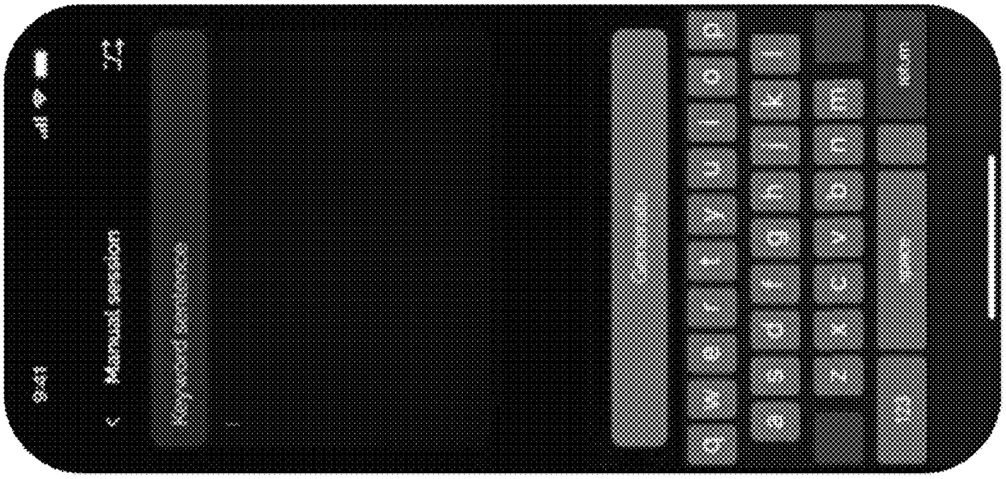

The lyrics module 504 may be a software module dedicated to anything related to the song lyrics (e.g., providing choices, selection, generation of lyrics parameters). For example, the it may provide the user interfaces shown in FIGS. 6K (i.e., a lyrics parameter interface 13 providing the user with lyrics parameters options to select from), 6L (i.e., a guided lyrics parameter selection interface 76 providing lyrics option filtering 76', 76", 76*), 6M (i.e., a lyrics interface 77 allowing the user to add or select lyrics parameters, other than the provided options, for automatically generating lyrics) and 6N (i.e., a lyrics interface 78 allowing the user to use their own lyrics) for example.

Figure 6O:
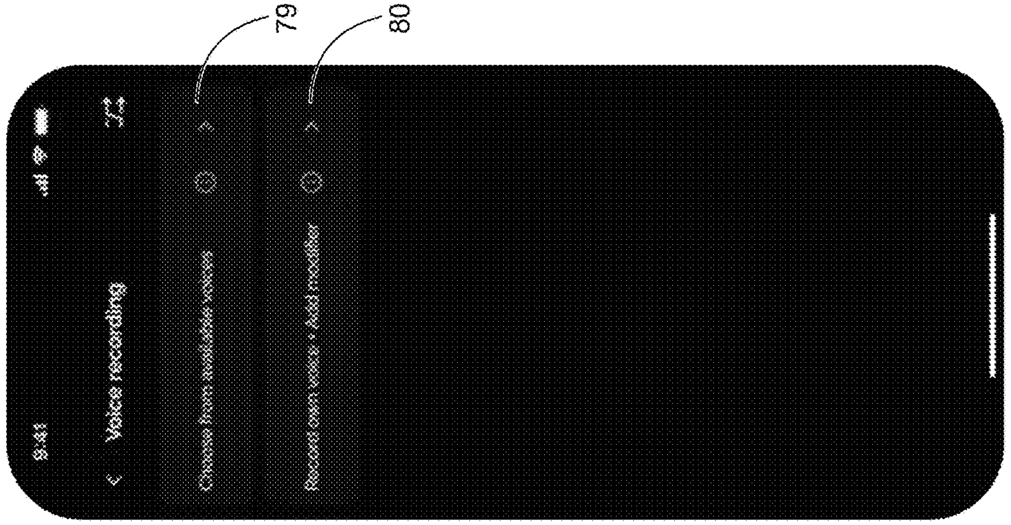
Figure 6P:
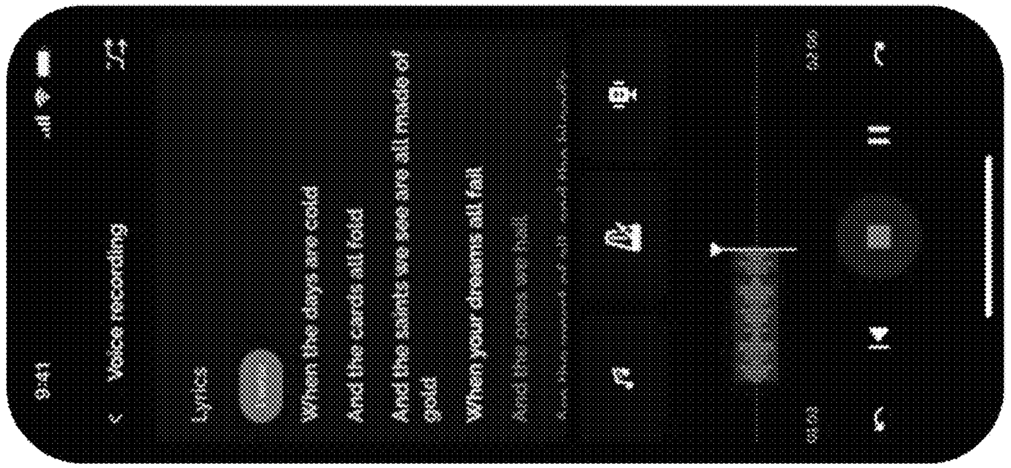
Figure 6Q:
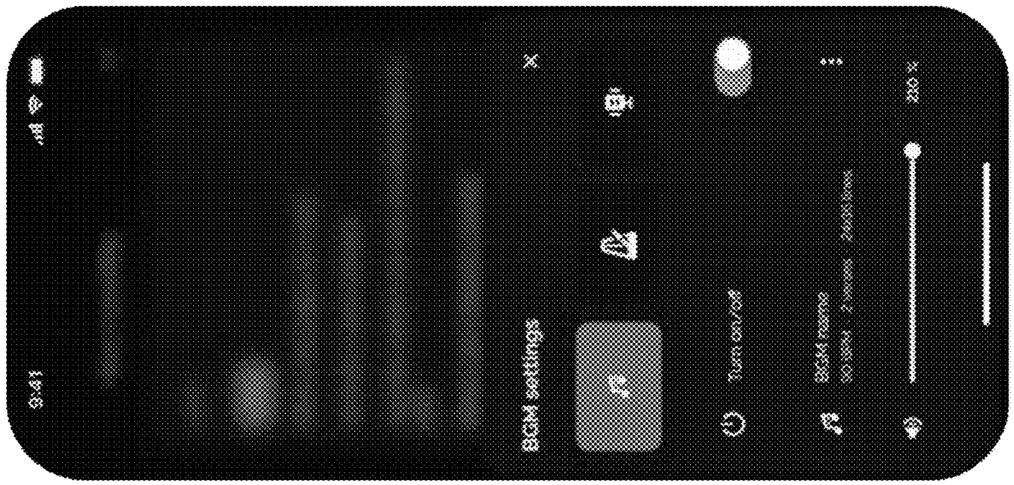
Figures 6R, 6S:
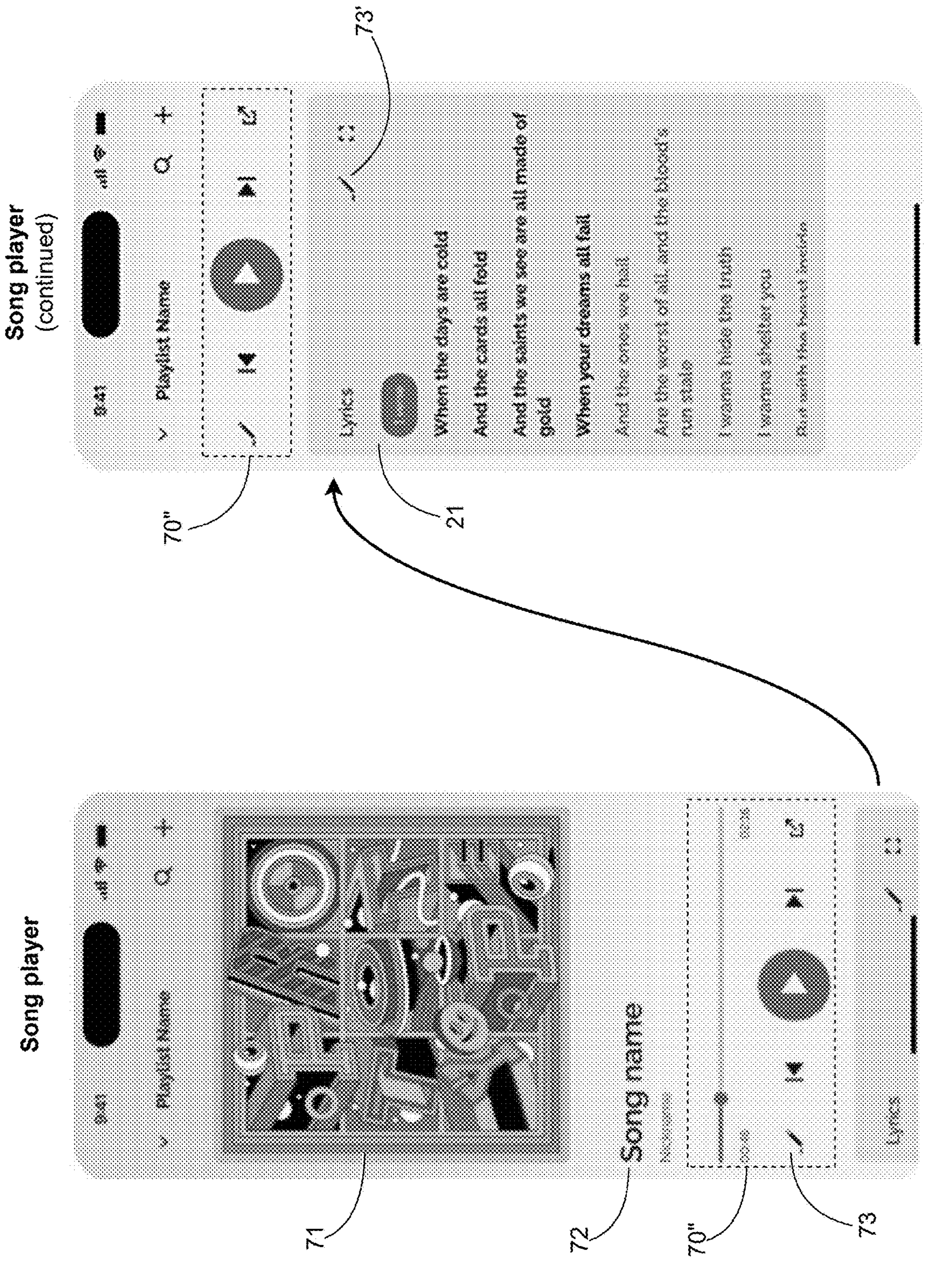

The voice module 506 may be a software module dedicated to anything related to the singing voice (e.g., providing choices, selection, generation of voice parameters, recording the user's voice, etc.), which may provide the user interfaces shown in FIGS. 6O (i.e., a voice selection interface 12 that may prompt the user to select one of the available voice 79 or to record the vocals 80), 6P (i.e., a voice recorder interface 80) and 6Q (i.e., various voice recorder control parameters and options that may be provided) for example.

The prompt generator 200 (e.g., see FIG. 2B) may include a prompt filter module 220. The communication module 512 may use the internet, Bluetooth®, Wi-Fi, or any other means to communicate data between the various hardware components and with any external component of the App that may not be provided by the user's device 410, such as the automatic content generator 101, a remote/cloud server 420 or social media platforms.

The user profile module 514 may be a software module dedicated to anything related to the in-app user profile (e.g., song history, user's library user's avatar, friends list, in-app information, etc.), which may provide the user interfaces shown in FIG. 6A (i.e., an account creation 61 or access/login 62 interface, providing virtual account login options 63,) and 6B (i.e., a user's library that may be used as a main menu of the App that may lead to playlists, user's songs, user's draft, a user's profile 65 of a user's documents or messages 64).

The randomizer module 516 provides the App with the capacity to provide randomized keywords and/or song parameters, which may be proposed to the user, selected thereby and used thereafter. One embodiment of a randomizer is shown in FIG. 6C, where after the user triggers the randomizer (e.g., by selecting a dedicated button 66 or alternative functions such as shaking of the smartphone) various randomly selected or generated words or combination of words a provided to the user (e.g., by drifting or falling over the display). The randomizer may allow for a keyword to be provided by the user (function 68), which may be randomly combined with other random or related words.

The display module 518 may be any portion of the program (App) that is used to provide the user interface and adapt it to the specific display used.

Figure 6T:
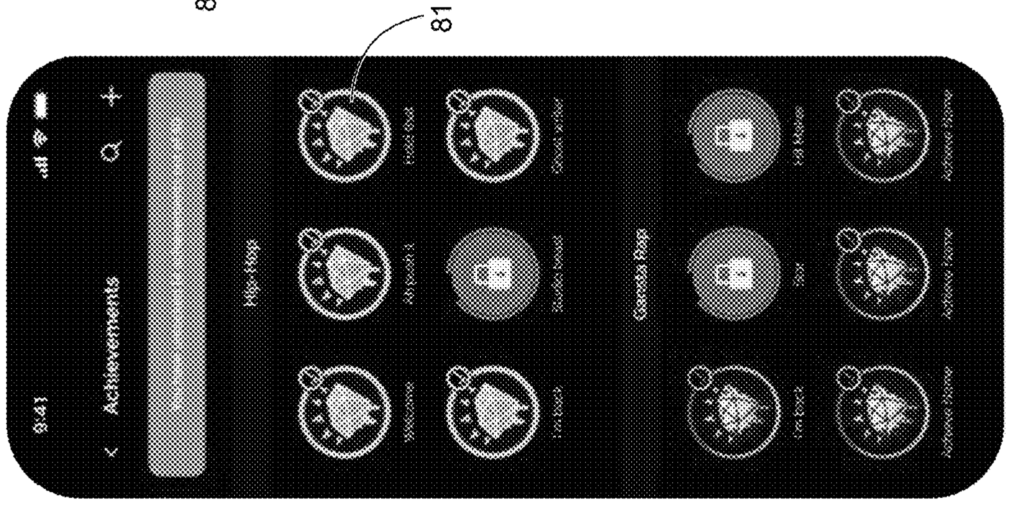
Figure 6U:
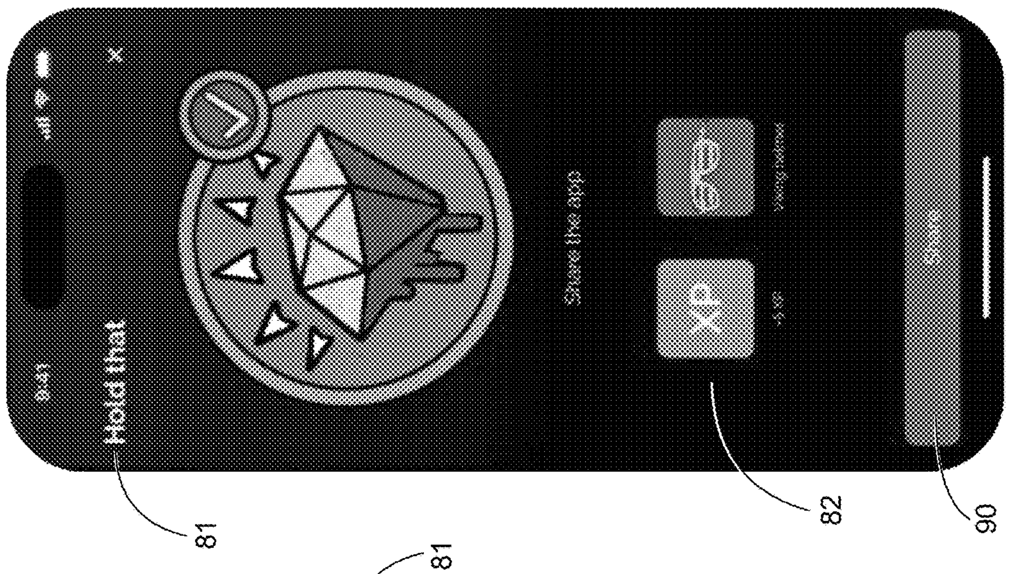
Figure 6V:
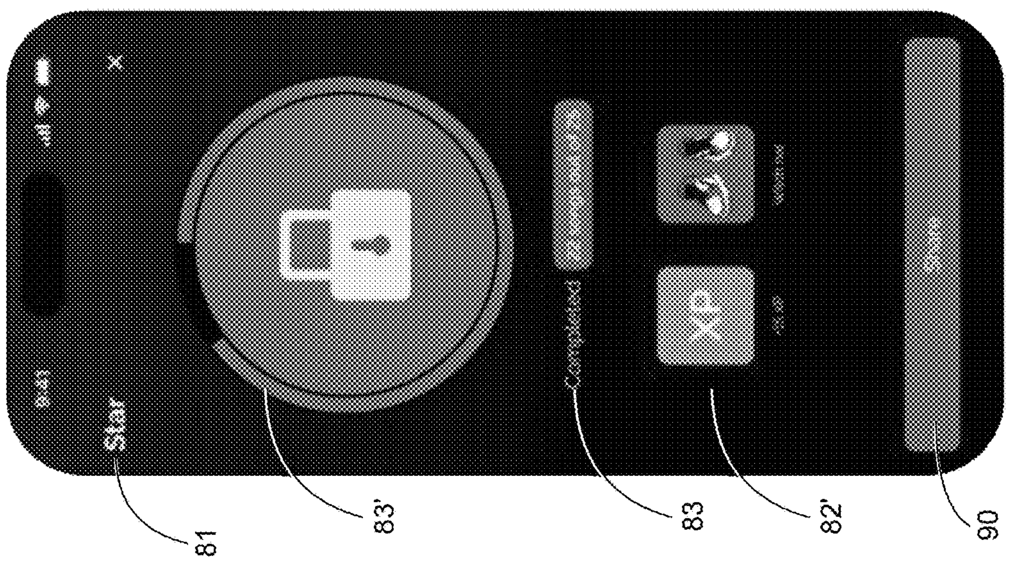

The reward and ranking module 520 may be a software module dedicated to anything related to in-app achievements and rewards that have been collected/unlocked and any upcoming (not yet unlocked) achievements or rewards. This module may also provide achievements and reward progress of the specific user's profile. Examples, of the corresponding feature are shown in FIGS. 6T (i.e., a reward system dashboard interface 20 showing a list of achievements 81), 6U (i.e., a acquired rewards details interface, showing a sharing feature 90, acquired rewards 82 when unlocking the achievement 81) and 6V (i.e., a reward system interface showing a sharing feature 90, the achievement's progress 83, a progress bar 83' and upcoming rewards 82 that will be acquired once the achievement 81 has been unlocked).

The playback module 522, may provide any suitable playback interface and features. FIGS. 6R and 6S show an example of the playback interface of the App, which may provide all features of state-of-the-art playback interfaces. The cover image 71, the song name 72, playback options 70", and song lyrics may be displayed. A directory 73 that leads to the song editing module 524 may be optionally provided.

The editing module 524 may be provided to allow the user to modify their song (e.g., crop, change or regenerate any song components or portions of the song, change the cover image, change the name, etc.).

The program may allow the user to customize and finalize their generated songs. FIGS. 6D to 6H shows various examples of interfaces that may be provided to the user to customize their song. FIGS. 6D and 6E show a virtual "recording studio", which may be provided by the voice recorder module 536, where the various selected song components (e.g., background music component 11', voice component 12', lyrics component 13', etc.) may be listed before. A "save" option 69 may be provided to save the latest changes, a playback option 70 may be provided to listen to one of the selected components, and a finish option 71 may be selected to generate or merge the various components together to produce a song. FIG. 6F shows an interface for selecting the name 72 of the produced song and a cover image 71 therefore. The interfaces of FIGS. 6G and 6H may be displayed to the user to confirm that the song production process has been completed and to congratulate the user for creating a new song. An option 73 to share the newly produced song may be provided. A playback option 70 may optionally be provided when the song has been finalized.

The social media sharing module 526 may provide the app with all the necessary features required to share (e.g., upload) the generated content on various platforms (e.g., social media or via online messaging).

The sponsor data module 528 may provide information about a sponsor that wants to advertise their product via the App 30. In some embodiments, the sponsor data module 528 may store sponsored advertisement information (e.g., adds, promoted content or song parameters, list of products to be advertised, audience targeting data). For example, the sponsored advertisement information may include audience targeting data. In one embodiment, the audience targeting data may be used to automatically provide one or more additional keywords or song parameter based user personal information. For example, when a specific item is identified in the selected song parameters, say a "sport car" for example, sponsored brand (e.g., Ferrari™) associated with the item may be added to the song parameter such that the sponsored item/product is automatically added to the generated song component, thereby the sponsored item may be automatically advertised in the App. In one embodiment, sponsor may be a specific artist, such that their names may be added to the song parameters to be mentioned in the lyrics or such that their voice may be used as back vocals for example. The sponsor data module 528 may include various categories of information which may include, but may not be limited, to: campaign information; sponsor advertisement information; product information; audience targeting data; first-party data; third party; etc. The sponsor advertisement information may further provide and use audience targeting data which may include, but may not be limited to: target demographic data, target psychographic data, behavioral data, etc.

The user's personal date module 530, may provide, access and collect personal information about the user, such as user's demographic data, user's psychographic data, user's data, etc. The user's personal date module 530 may be configured to access the user information from an external database (e.g., information from an associated tech conglomerate). The information comprised in or used by the user's personal date module 530, may be used to personalize the song parameters to be tailored for a specific user and/or to better tailor the advertisement provided by the sponsor data module 528.

The music video module 532 may enable the user to generate a personalized music video for one of their previously generated songs. This module may provide a user interface for use by the user to define various music video parameters to generate a prompt therewith to be sent to the automatic content generator 101 for producing a personalized music video for the desired previously generated song.

The famous voice module 534 may comprise the singing voice of various famous singers that have agreed to make it available and usable in the App.

The speech-to-text module 538 may provide to convert voice inputs (e.g., keywords) from the user into text to be used as song parameters. For example, the user may dictate their own lyrics to be converted to text in the App.

The subscription module 540 may be used to keep track of the current subscription of the user, provide details about various subscriptions, tiers prompt the user for a promotion on higher tiers, etc. Higher tiers subscriptions may provide advantages to the user, such as unlocking additional voices or increasing the maximum of generated songs, etc.

The monetization module 542, may allow a user to be rewarded by in-app currency (i.e., virtual currency that may be, but is not limited to: money, coins, tokens, gold, credits, etc.) or monetary profits based on the popularity (e.g., use or repost) of their generated songs on social media or elsewhere.

In order to provide more granular choices and options to the user, it will be appreciated that a drop-down selection/menu may be provided by one or more user interface of the App for any suitable parameter of features thereof. For example, a drop-down menu may be provided for one or more of the parameters, e.g., background parameter 11, voice parameters 12, lyrics parameters 13, etc., which may be displayed once the user selects a corresponding button (e.g., by double-clicking it). In one embodiment, the drop-down menu may be provided to present various voice parameters options listing different voices of singers or users.

What is claimed is:

1. A computing program product for generating a text-based prompt based on song parameters determined by a user of a user's device, the text-based prompt being usable as an input of an automatic content generator for generating at least one automatically generated song component based on the input, the computing program product comprising non-transitory memory storing executable program code that, when executed by a processor, causes the processor to:

a) provide, via a user interface of the user's device in communication with or connected to the processor, the user with song parameters options comprising at least one of the groups consisting of:
   a list of predefined song parameters options, and
   randomized keywords each indicative of at least one of the song parameter options;
b) receive, via the user interface, at least one of the group consisting of:
   one or more user input indicative of a selected one of the provided song parameters options, and
   one or more user-provided song parameter;
c) determine the song parameters based on the at least one of the groups consisting of: the received user input, and the received user-provided song parameter;
d) identify a priority song parameter among the song parameters;
e) access filtering rules specific to said priority song parameter, said filtering rules reducing a chance of conflict between said priority song parameter and a remainder of the song parameters;
f) filter the song parameters using said filtering rules; and
g) determine a text-based prompt for use by the automatic content generator based on the filtered song parameters, wherein said prompt has a reduced chance to generate the at least one automatically generated song component inconsistent with said priority song parameter.

2. The computing program product of claim 1, wherein the step of determining the song parameters or the step of determining the text-based prompt is further based on information originating from a separate or complementary program, wherein the information comprises at least one of: personal information of the user; external content information; and contextual information.

3. The computing program product of claim 1, wherein the priority song parameter is a predetermined specific music genre, and wherein the filtering rules comprise one or more rules that ensure that the music genre of the at least one automatically generated song component corresponds to the specific music genre.

4. The computing program product of claim 3, wherein the filtering rules comprise one or more rules that ensure that the music genre of the at least one automatically generated song component is Rap if the determined song parameters include at least one music genre other than Rap or does not include any music genre.

5. The computing program product of claim 1, wherein the program code, when executed by the processor, further causes the processor to provide additional randomized keywords when requested by the user.

6. The computing program product of claim 1, wherein the song parameters comprise background lyrics parameters, wherein the text-based prompt comprises instructions defining desired song lyrics, and wherein the at least one automatically generated song components include an automatically generated song lyrics.

7. The computing program product of claim 1, wherein the at least one automatically generated song component comprises one of the group consisting of:
   background music;
   a singer voice;
   song lyrics;
   album or song cover art; and
   at least part of a music video.

8. The computing program product of claim 1, wherein the filtering rules used in the step of filtering the song parameters comprises removing the remainder of the conflicted song parameters.

9. The computing program product of claim 1, wherein the song parameters comprise background music parameters, wherein the text-based prompt comprises instructions defining a desired background music, and wherein the at least one automatically generated song components include an automatically generated background music.

10. The computing program product of claim 1, wherein the song parameters comprise voice parameters and lyrics parameters, wherein the text-based prompt comprises instructions defining a desired song vocals in a desired singing voice, and wherein the at least one automatically generated song components include an automatically generated song vocals.

11. The computing program product of claim 1, wherein the provided song parameter options comprise at least one of the group consisting of:
   background music parameter options;
   voice parameter options;
   lyrics parameter options; and
   video parameter options.

12. The computing program product of claim 7, wherein the background music parameter options include background music provided by the user's device or an automatically generated background music generated by the automatic generator.

13. The computing program product of claim 1, wherein the one or more user-provided song parameter comprises lyrics provided by the user; and wherein the step of determining the song parameters is based at least on the lyrics provided by the user.

14. The computing program product of claim 1, wherein one of the automatically generated song components is an artificial intelligence (AI) generated song component, and wherein the content generator is an AI generator for generating at least one of the AI generated song components.

15. The computing program product of claim 11, wherein the provided song parameter options comprise the lyrics parameter options, said lyrics parameter options comprise AI-generated keywords provided by a natural language model (NLM) in response to the user-provided keyword.

16. The computing program product of claim 1, wherein the program code, when executed by the processor, further causes the processor to:
   receive audio input data from a microphone of the user's device in communication with or connected to the processor to:
      I. use speech-to-text functions to convert the audio input data into text to be used as one of the one or more user-provided song parameter, or II. record at least part of the audio input data as a voice recording; and alter or modulate the voice recording to change how a voice of the voice recording sounds to a listener when playback through a speaker.

17. The computing program product of claim 16, wherein, when the processor is in communication with or connected to a speaker of the user's device, the program code, when executed by the processor, further causes the processor to send audio output data to the speaker of the user's device to play background music or a metronome sound during a recording of the voice recording.

18. The computing program product of claim 1, wherein the program code, when executed by the processor, further causes the processor to send user interface data to the user interface to have the user interface display a dedicated randomizer comprising gamified user-interactive features.

19. The computing program product of claim 18, wherein the gamified user-interactive features provide at least one of: a user-interactive slot machine; a user-interactive Rap battle interface; a user-interactive bowling alley interface; a word shaker interface responsive to readings from accelerometers and gyroscopes of the user's device; and a user-interactive balloon or bubbles popper interface.

20. The computing program product of claim 1, wherein said predefined song parameters options or said randomized keywords are editable by the user; wherein the program code, when executed by the processor, further causes the processor to receive, via the user interface, information indicative of edits made by the user to said predefined song parameters options or said randomized keywords; and wherein said determining the song parameters is further based on the received information indicative of edits made by the user to said predefined song parameters options or said randomized keywords.

* * * * *